United States Patent
Goto et al.

(10) Patent No.: US 11,370,197 B2
(45) Date of Patent: *Jun. 28, 2022

(54) DECORATIVE SHEET AND DECORATIVE MATERIAL USING SAME

(71) Applicant: Dai Nippon Printing Co., Ltd., Tokyo (JP)

(72) Inventors: Osamu Goto, Furukawa (JP); Masanori Ueno, Fujimi (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/278,390

(22) PCT Filed: Sep. 30, 2019

(86) PCT No.: PCT/JP2019/038566
§ 371 (c)(1),
(2) Date: Mar. 22, 2021

(87) PCT Pub. No.: WO2020/067569
PCT Pub. Date: Apr. 2, 2020

(65) Prior Publication Data
US 2021/0354423 A1 Nov. 18, 2021

(30) Foreign Application Priority Data
Sep. 28, 2018 (JP) .............................. JP2018-184058

(51) Int. Cl.
*B32B 7/12* (2006.01)
*B32B 7/023* (2019.01)
(Continued)

(52) U.S. Cl.
CPC ................ *B32B 7/023* (2019.01); *B32B 7/12* (2013.01); *B32B 27/08* (2013.01); *B32B 27/18* (2013.01);
(Continued)

(58) Field of Classification Search
CPC ....... B32B 13/04; B32B 13/042; B32B 13/06; B32B 13/10; B32B 13/12; B32B 15/043;
(Continued)

(56) References Cited

U.S. PATENT DOCUMENTS

| | | |
|---|---|---|
| 2003/0054169 A1 | 3/2003 | Murschall et al. |
| 2012/0099187 A1 | 4/2012 | Meyer Zu Berstenhorst et al. |
| 2012/0177929 A1 | 7/2012 | Meyer Zu Berstenhorst et al. |

FOREIGN PATENT DOCUMENTS

| | | | |
|---|---|---|---|
| JP | 2000-117905 A | 4/2000 |
| JP | 2003-522659 A | 7/2003 |

(Continued)

OTHER PUBLICATIONS

International Search Report dated Nov. 5, 2019, issued for PCT/JP2019/038566.

*Primary Examiner* — Lawrence D Ferguson
(74) *Attorney, Agent, or Firm* — Locke Lord LLP

(57) ABSTRACT

Provided is a decorative sheet comprising a base material layer, a transparent resin layer and a surface protection layer in the presented order, wherein at least one of the base material layer and the transparent resin layer is constituted by a resin composition comprising a resin having an ultraviolet absorption wavelength at least at 270 to 300 nm; absorbance $A_{11}$ of the surface protection layer at wavelengths from 270 to 300 nm is 0.6 or more; and absorbance $A_{12}$ of the transparent resin layer and the surface protection layer at wavelengths from 270 to 300 nm is 2.7 or more, and wherein the decorative sheet can suppress time-dependent (Continued)

degradation caused by ultraviolet ray, and has excellent weather resistance. Also provided is a decorative material obtained using the decorative sheet.

13 Claims, 1 Drawing Sheet

(51) Int. Cl.
    *B32B 27/08* (2006.01)
    *B32B 27/18* (2006.01)
    *B32B 27/32* (2006.01)
    *B32B 27/36* (2006.01)
    *B32B 3/30* (2006.01)

(52) U.S. Cl.
    CPC .............. *B32B 27/32* (2013.01); *B32B 27/36* (2013.01); *B32B 27/365* (2013.01); *B32B 3/30* (2013.01); *B32B 2250/24* (2013.01); *B32B 2255/10* (2013.01); *B32B 2255/26* (2013.01); *B32B 2255/28* (2013.01); *B32B 2307/412* (2013.01); *B32B 2307/71* (2013.01); *B32B 2451/00* (2013.01)

(58) Field of Classification Search
    CPC ..... B32B 15/06; B32B 15/082; B32B 15/085; B32B 15/09; B32B 15/098; B32B 15/10; B32B 15/18; B32B 15/20; B32B 18/00; B32B 21/02; B32B 21/042; B32B 21/045; B32B 21/08; B32B 21/14; B32B 2250/24; B32B 2255/10; B32B 2255/26; B32B 2255/28; B32B 2264/102; B32B 2264/104; B32B 2264/105; B32B 2264/108; B32B 2270/00; B32B 2307/4026; B32B 2307/412; B32B 2307/414; B32B 2307/554; B32B 2307/704; B32B 2307/71; B32B 2307/712; B32B 2307/724; B32B 2307/732; B32B 2307/75; B32B 23/04; B32B 23/042; B32B 23/044; B32B 23/046; B32B 2419/00; B32B 2451/00; B32B 2479/00; B32B 25/042; B32B 2605/003; B32B 2607/00; B32B 27/08; B32B 27/16; B32B 27/18; B32B 27/20; B32B 27/22; B32B 27/285; B32B 27/302; B32B 27/304; B32B 27/306; B32B 27/308; B32B 27/32; B32B 27/36; B32B 27/365; B32B 27/42; B32B 3/30; B32B 7/023; B32B 7/12; B32B 9/005; B32B 9/04; B32B 9/041; B32B 9/042; B32B 9/043; B32B 9/045; C04B 2235/3208; C04B 2235/3213; C04B 2235/3244; C04B 2235/6025; C04B 2235/6562; C04B 2235/661; C04B 35/4682

See application file for complete search history.

(56) References Cited

FOREIGN PATENT DOCUMENTS

| | | |
|---|---|---|
| JP | 2008-114560 A | 5/2008 |
| JP | 2011-208099 A | 10/2011 |
| JP | 2012-526672 A | 11/2012 |
| JP | 2013-505149 A | 2/2013 |
| JP | 2013-067173 A | 4/2013 |
| JP | 2014-079965 A | 5/2014 |
| JP | 2018-144439 A | 9/2018 |
| JP | 2018-171835 A | 11/2018 |
| JP | 2019-178320 A | 10/2019 |

[Fig. 1]
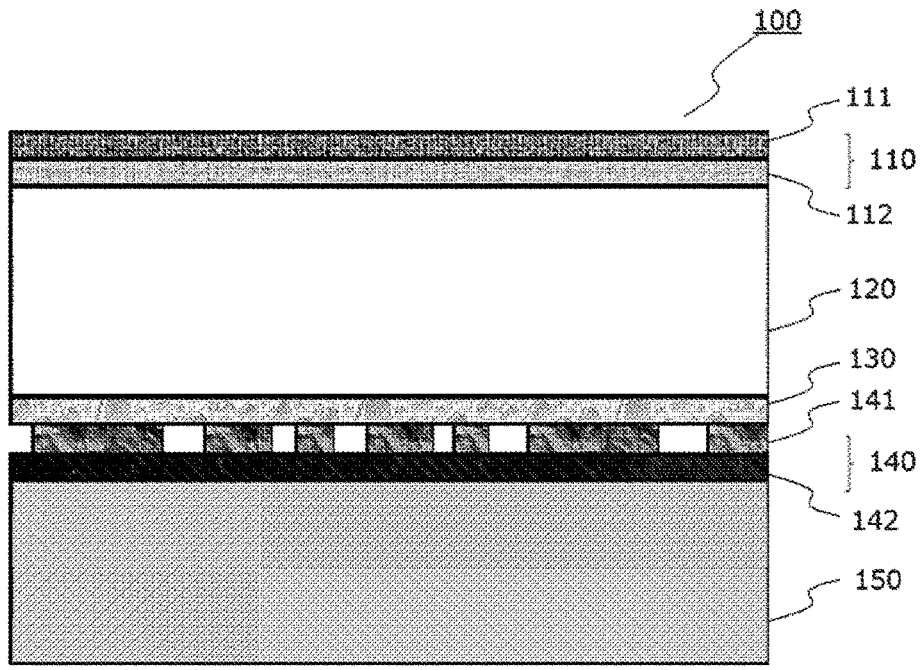
[Fig. 2]
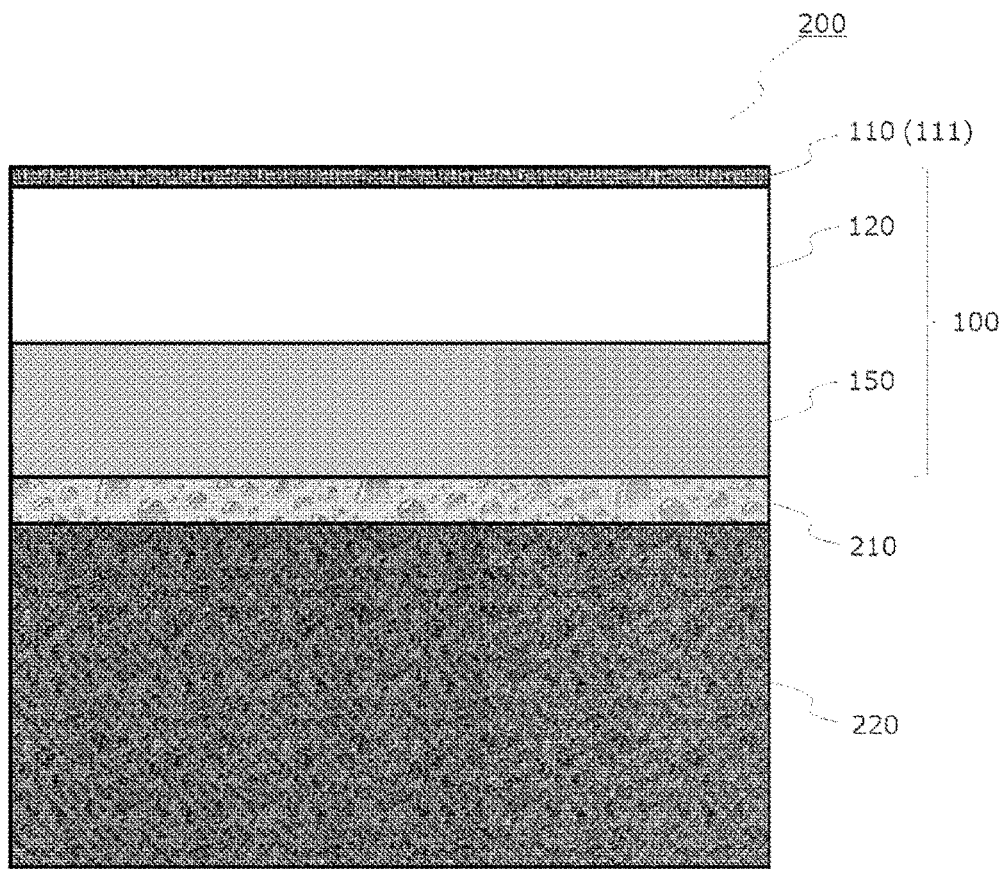

DECORATIVE SHEET AND DECORATIVE MATERIAL USING SAME

CROSS REFERENCE TO RELATED APPLICATIONS

This application is related to co-pending application: "DECORATIVE SHEET AND DECORATIVE MATERIAL USING SAME" filed even date herewith in the names of Osamu Goto and Masanori Ueno as a national phase entry of PCT/JP2019/038253, which application is assigned to the assignee of the present application and is incorporated by reference herein.

TECHNICAL FIELD

The present invention relates to a decorative sheet and a decorative material obtained using the same.

BACKGROUND ART

Decorative sheets are used for the purpose of decorating or protecting the surfaces of building interior members such as walls, ceilings, floors, and front doors or exterior members such as exterior walls, roofs, eave ceilings, fences, and gates, joinery or fixture members such as window frames, doors, railings, baseboards, crown moldings, and covers as well as general furniture such as drawers, shelves, and desks, kitchen furniture such as dining tables and sinks, or cabinets for light electrical products or office automation equipment, etc. The decorative sheets that are used for the purpose of decorating or protecting surfaces of these members adopt, for example, a configuration having a surface protection layer on a base material.

When these decorative sheets are used for outdoor purposes, there arise problems associated with weather resistance, such as color change or resin degradation caused by the influence of the wind and rain and ultraviolet ray from insolation. Even for indoor purposes, for example, for purposes involving exposure to sunlight at the window or the like, there arise similar problems to those for outdoor purposes. For the decorative sheets that are used for such purposes, the addition of ultraviolet absorbers as weathering agents into surface protection layers of the decorative sheets is generally practiced as approaches for improving their weather resistance.

However, ultraviolet absorbers disadvantageously tend to bleed out from surface protection layers over time. The bleed-out of the ultraviolet absorbers mars the beauty of decorative sheet surfaces in such a way that stickiness is caused, and also presents problems such as reduction in weather resistance resulting from lowered ultraviolet absorber concentrations in the surface protection layers over time. Under these circumstances, decorative sheets having a cured resin layer composed mainly of an electron beam curable resin containing an electron beam reactive ultraviolet absorber selected from, for example, specific benzotriazole compounds, have been proposed (e.g., PTL1) in order to solve the bleed-out of the ultraviolet absorbers.

CITATION LIST

Patent Literature

PTL1: JP 2000-117905 A

SUMMARY OF INVENTION

Technical Problem

A decorative sheet described in PTL1 is capable of solving the problems of bleed-out of ultraviolet absorbers.

Decorative sheets are increasingly required to have processing suitability for embossing, bending, molding, or the like. Decorative sheets having a layer containing a resin, such as polycarbonate resin, excellent in processing suitability have been under development in recent years. For example, decorative sheets having a layer containing the resin, and further having a surface protection layer have been studied. In the case of applying a surface protection layer of PTL1 to a surface protection layer in such a decorative sheet having a layer containing the resin such as polycarbonate resin, the decorative sheet frequently has the disadvantage that the decorative sheet cannot suppress time-dependent degradation caused by ultraviolet ray, even if suppressing the bleed-out of an ultraviolet absorber in the surface protection layer. The inventors have further pursued investigation and consequently found that this disadvantage arises mainly due to a property of having an ultraviolet absorption wavelength at least at 270 to 300 nm among the resins such as polycarbonate resin; and layers consisting of these resins are degraded by the energy (photon) of absorbed ultraviolet ray at wavelengths from 270 to 300 nm.

The present invention has been made under these circumstances, and an object of the present invention is to provide a decorative sheet having a layer comprising a resin having a specific ultraviolet absorption wavelength, and a decorative material obtained using the same, wherein the decorative sheet suppresses time-dependent degradation caused by ultraviolet ray, and has excellent weather resistance.

Solution to Problem

To attain the object, the present invention provides the following [1] to [2].

[1] A decorative sheet comprising a base material layer, a transparent resin layer and a surface protection layer in the presented order, wherein at least one of the base material layer and the transparent resin layer is constituted by a resin composition comprising a resin having an ultraviolet absorption wavelength at least at 270 to 300 nm; and absorbance All of the surface protection layer at wavelengths from 270 to 300 nm is 0.6 or more, and absorbance $A_{12}$ of the transparent resin layer and the surface protection layer at wavelengths from 270 to 300 nm is 2.7 or more, the absorbances being measured in accordance with JIS K0115: 2004.

[2] A decorative material comprising an adherend and a decorative sheet according to [1].

Advantageous Effects of Invention

The present invention can provide a decorative sheet having a layer comprising a resin having a specific ultraviolet absorption wavelength, and a decorative material obtained using the same, wherein the decorative sheet can suppress time-dependent degradation caused by ultraviolet ray, and has excellent weather resistance.

BRIEF DESCRIPTION OF DRAWINGS

FIG. 1 is a cross-sectional view showing one embodiment of the decorative sheet of the present invention.

FIG. 2 is a cross-sectional view showing one embodiment of the decorative material of the present invention.

DESCRIPTION OF EMBODIMENTS

[Decorative Sheet]

The decorative sheet of the present invention comprises a base material layer, a transparent resin layer and a surface protection layer in the presented order, wherein at least one of the base material layer and the transparent resin layer is constituted by a resin composition comprising a resin having an ultraviolet absorption wavelength at least at 270 to 300 nm; and absorbance $A_{11}$ of the surface protection layer at wavelengths from 270 to 300 nm (hereinafter, also simply referred to as "absorbance $A_{11}$") is 0.6 or more, and absorbance $A_{12}$ of the transparent resin layer and the surface protection layer at wavelengths from 270 to 300 nm (hereinafter, also simply referred to as "absorbance $A_{12}$") is 2.7 or more, the absorbances being measured in accordance with JIS K0115: 2004.

FIG. 1 is a cross-sectional view showing an embodiment of a decorative sheet 100 of the present invention.

The decorative sheet 100 of FIG. 1 comprises a base material layer 150, a transparent resin layer 120, and a surface protection layer 110 in the presented order. The surface protection layer 110 in the decorative sheet 100 of FIG. 1 is constituted by a primer layer 112 and a top coat layer 111. The decorative sheet 100 of FIG. 1 also has a decoration layer 140 consisting of a picture layer 141 and a solid colored layer 142, and an adhesive layer A 130 between the base material layer 150 and the transparent resin layer 120.

<Absorbance>

The decorative sheet of the present invention has absorbance $A_{11}$ of 0.6 or more and absorbance $A_{12}$ of 2.7 or more. Larger absorbance $A_{11}$ means that less light (ultraviolet ray) at wavelengths from 270 to 300 nm reaches the transparent resin layer positioned on the side close to the surface protection layer. Larger absorbance $A_{12}$ means that less light (ultraviolet ray) at wavelengths from 270 to 300 nm reaches the base material layer positioned on the side distant from the surface protection layer. In the present invention, an absorbance at a specific wavelength band, such as the absorbance $A_{11}$ or the absorbance $A_{12}$, means a value obtained by averaging absorbances A (λ) at respective wavelengths λ within the range of $\lambda_{min} \leq \lambda \leq \lambda_{max}$ (hereinafter, also simply referred to "from $\lambda_{min}$ to $\lambda_{max}$") of such a wavelength band, as to the wavelengths within the range of $\lambda_{min} \leq \lambda \leq \lambda_{max}$. The averaged value will be mentioned in detail in the description about methods for measuring the absorbance $A_{11}$ and the absorbance $A_{12}$.

Conventional decorative sheets are usually designed such that ultraviolet absorbers are added only to surface protection layers, i.e., designed as to only the absorbance $A_{11}$. However, the design of only the absorbance $A_{11}$ has limitations on improvement in the weather resistance of decorative sheets. All the ultraviolet absorbers, albeit in varying degrees depending on their types, are lost over time due to bleed-out to the outside from surface protection layers so that the concentrations of the ultraviolet absorbers are lowered in the surface protection layers. Hence, such decorative sheets are capable of suppressing the degradation of each layer, such as a transparent resin layer immediately below a surface protection layer, and a lower base material layer, caused by ultraviolet ray in the short run and however, have the difficulty in obtaining excellent weather resistance by continuously suppressing degradation caused by ultraviolet ray over a long period. Usually, weather resistance is evaluated from the time for the degradation, attributed to ultraviolet ray, of each layer such as a transparent resin layer and a lower base material layer (i.e., the whole decorative sheet) exposed to sunlight including ultraviolet ray, to reach a predicted predetermined degree. Thus, the design to elevate only the absorbance $A_{11}$ of the surface protection layer has limitations on improvement in weather resistance.

Another possible design is to improve weather resistance (time to reach degradation) by adding an ultraviolet absorber into a surface protection layer such that the content of the ultraviolet absorber includes an extra that compensates for a loss caused by bleed-out over time. In this case, however, there arise problems of reduction in the surface characteristics, such as abrasion resistance or stain resistance, of the surface protection layer attributed to the excessive addition of the ultraviolet absorber. A phenomenon becomes prominent, for example, appearance degradation such as surface white turbidity caused by the ultraviolet absorber bleeding out. Therefore, it is virtually difficult to adopt such design. If the bleed-out of an ultraviolet absorber can be suppressed, excellent weather resistance cannot be imparted to decorative materials when the absorption wavelength band of the ultraviolet absorber and an absorbance at each absorption wavelength are incompatible for each layer such as a base material layer or a transparent resin layer. It has been revealed that mere suppression of bleed-out does not produce excellent weather resistance.

Even if two types of absorbances (absorbance $A_{11}$ and absorbance $A_{12}$) are defined, absorbance $A_{11}$ of less than 0.6 or absorbance $A_{12}$ of less than 2.7 fails to sufficiently suppress time-dependent degradation caused by ultraviolet ray as to the decorative sheet having a layer constituted by a resin composition comprising a resin having an ultraviolet absorption wavelength at least at 270 to 300 nm.

Both the absorbance $A_{11}$ and the absorbance $A_{12}$ defined in the present invention are absorbances for ultraviolet ray at wavelengths from 270 to 300 nm. A feature of the present invention is to define the wavelengths of ultraviolet ray to be absorbed and to allocate absorbances at the wavelengths between specific constituent layers at a specific ratio.

As already mentioned, it has been revealed that decorative sheets having a layer comprising a resin having an ultraviolet absorption wavelength at least at 270 to 300 nm, such as polycarbonate resin, frequently have the disadvantage that the decorative sheets cannot suppress time-dependent degradation caused by ultraviolet ray. For example, polycarbonate resin has strong absorption at or near wavelengths from 280 to 290 nm, and of 295 nm and 345 nm and has strong absorption at or near wavelengths from 270 to 300 nm. Hence, the disadvantage described above is caused probably because photons, particularly, at wavelengths from 270 to 300 nm, contribute to the degradation of the resins.

The present invention focuses on two types of absorbances (absorbance $A_{11}$ and absorbance $A_{12}$) as to ultraviolet ray at wavelengths from 270 to 300 nm that have high energy (photon) among absorption wavelengths and tend to be directly connected to the degradation of resins, and enables a decorative sheet having a layer comprising a resin having an ultraviolet absorption wavelength at least at 270 to 300 nm, such as polycarbonate resin, to suppress time-dependent degradation caused by ultraviolet ray and to have excellent weather resistance by setting the two types of absorbances (absorbance $A_{11}$ and absorbance $A_{12}$) to specific ranges.

The absorbance $A_{11}$ requires being 0.6 or more, as described above. The absorbance $A_{11}$ is preferably 0.8 or more, more preferably 1.0 or more, further preferably 1.2 or more, in consideration of improvement in weather resistance and is also preferably 5.0 or less, more preferably 3.5 or less, further preferably 2.0 or less, in consideration of the suppression of bleed-out, the suppression of reduction in the surface characteristics, such as abrasion resistance, of the surface protection layer, the processing suitability of the decorative sheet, etc.

The absorbance $A_{12}$ requires being 2.7 or more, as described above, and is preferably 2.8 or more, more preferably 3.0 or more, further preferably 3.2 or more, in consideration of improvement in weather resistance. The upper limit of the absorbance $A_{12}$ is not particularly limited and is preferably 5.0 or less, more preferably 4.5 or less, further preferably 4.0 or less, in consideration of weather resistance as well as the suppression of bleed-out.

The absorbance $A_{11}$ and the absorbance $A_{12}$ can be adjusted by the type of an ultraviolet absorber, its content, the thickness of a layer containing the ultraviolet absorber, etc.

When the absorbance $A_{11}$ and the absorbance $A_{12}$ fall within the ranges described above and their ratio in the thickness direction, i.e., the absorbances in the thickness direction, are optimized, both the characteristics of the decorative sheet, i.e., improvement in weather resistance and the suppression of bleed-out, which tend to contradict each other, can be balanced and achieved at higher levels. From such a viewpoint, the ratio of the absorbance $A_{11}$ to the absorbance $A_{12}$ (absorbance $A_{11}$/absorbance $A_{12}$) is preferably 0.10 or more and 0.50 or less.

In the present invention, when the ratio of the absorbance $A_{11}$ to the absorbance $A_{12}$ (absorbance $A_{11}$/absorbance $A_{12}$) is 0.10 or more, the content of an ultraviolet absorber in the surface protection layer 110 is relatively increased. Therefore, the degradation, caused by ultraviolet ray, of each layer such as a transparent resin layer 120, an adhesive layer A 130, a decoration layer 140, or a base material layer 150 can be more suppressed. On the other hand, when the ratio is 0.50 or less, the content of an ultraviolet absorber in the surface protection layer 110 is relatively decreased. Therefore, bleed-out can be more suppressed. Thus, the ratio of 0.10 or more and 0.50 or less enables improvement in weather resistance and the suppression of bleed-out to be achieved at higher levels. From such a viewpoint, the ratio is more preferably 0.15 or more. The upper limit is more preferably 0.45 or less.

The absorbance $A_{12}$ is an average value of absorbances, measured at wavelengths from 270 to 300 nm, of a laminate of the surface protection layer 110 formed on the transparent resin layer 120, in accordance with JIS K0115: 2004.

The absorbance $A_{11}$ is obtained according to the equation given below in which an average value of absorbances, measured at wavelengths from 270 to 300 nm, of the transparent resin layer, in accordance with JIS K0115: 2004 is defined as $A_{10}$; and the absorbance $A_{10}$ is subtracted from the absorbance $A_{12}$. The average value of absorbances is defined as an average value of absorbances measured at 1-nm intervals at wavelengths from 270 to 300 nm (a total of 31 absorbances).

Absorbance $A_{11}$=Absorbance $A_{12}$−Absorbance $A_{10}$

When samples for measurement of a single layer of the surface protection layer 110 constituting the decorative sheet 100 and a two-layer laminate of the surface protection layer 110 and the transparent resin layer 120 are obtained in the measurement of the absorbance of each layer (single layer or laminate) at wavelengths from 270 to 300 nm, each of the absorbance $A_{11}$ and the absorbance $A_{12}$ can be directly determined by measuring the absorbances of the single layer and the laminate.

When a single layer of the surface protection layer 110 and a two-layer laminate of the surface protection layer 110 and the transparent resin layer 120 are separable from the laminate constituting the decorative sheet 100, without changing the ultraviolet absorption characteristics of each layer, each of the absorbance $A_{11}$ and the absorbance $A_{12}$ can also be directly determined by measuring the absorbances of the single layer and the laminate separated from the decorative sheet.

In the decorative sheet of the present invention, absorbance $A_{21}$ of the surface protection layer at a wavelength of 310 nm (hereinafter, also simply referred to as "absorbance $A_{21}$") measured in accordance with JIS K0115: 2004 is preferably 0.8 or more.

Larger absorbance $A_{21}$ means that less light (ultraviolet ray) at a wavelength of 310 nm reaches the transparent resin layer positioned on the side close to the surface protection layer. As described above, the polycarbonate resin listed as an example of the resin having an ultraviolet absorption wavelength at least at 270 to 300 nm has no absorption wavelength at or near a wavelength of 310 nm (in the present specification, the term "near" means falling within the range of±10 nm). However, the polycarbonate resin is more capable of suppressing time-dependent degradation caused by ultraviolet ray, by preventing the arrival of light (ultraviolet ray) at or near a wavelength of 310 nm. Accordingly, when the absorbance $A_{21}$ is 0.8 or more, time-dependent degradation caused by ultraviolet ray can be more suppressed and weather resistance can be improved. The absorbance $A_{21}$ is preferably 4.0 or less, more preferably 3.0 or less, further preferably 1.5 or less, in consideration of improvement in weather resistance as well as the suppression of bleed-out, the suppression of reduction in the surface characteristics, such as abrasion resistance, of the surface protection layer, the processing suitability of the decorative sheet, etc.

In the decorative sheet of the present invention, absorbance $A_{22}$ of the transparent resin layer and the surface protection layer at a wavelength of 310 nm (hereinafter, also simply referred to as "absorbance $A_{22}$") measured in accordance with JIS K0115: 2004 is preferably 1.1 or more.

Larger absorbance $A_{22}$ means that less light (ultraviolet ray) at a wavelength of 310 nm reaches the base material layer positioned on the side distant from the surface protection layer. Specifically, weather resistance can be improved by setting the absorbance $A_{22}$ to 1.1 or more. The absorbance $A_{22}$ is preferably 5.0 or less, more preferably 3.5 or less, further preferably 2.0 or less, in consideration of improvement in weather resistance as well as the suppression of bleed-out.

The absorbance $A_{22}$ is obtained by measuring the absorbance, at a wavelength of 310 nm, of a laminate of the surface protection layer formed on the transparent resin layer, in accordance with JIS K0115: 2004.

The absorbance $A_{21}$ is obtained by measuring absorbance $A_{20}$ of the transparent resin layer at a wavelength of 310 nm in accordance with JIS K0115: 2004, and subtracting the absorbance $A_{20}$ from the absorbance $A_{22}$ (Absorbance $A_{21}$=Absorbance $A_{22}$−Absorbance $A_{20}$).

When a sample for absorbance measurement of each constituent layer (single layer or laminate) at a wavelength of 310 nm can be provided, the method for measuring the absorbance is the same as that for measuring the absorbance of a single layer or a laminate at wavelengths from 360 to 380 nm as described above.

<Surface Protection Layer>

The surface protection layer is a layer positioned on a face of the transparent resin layer on the side opposite to the base material layer. The surface protection layer may be formed from a single layer or may be formed from two or more layers such as a top coat layer and a primer layer as shown in FIG. 1. In this context, in the present specification, the "top coat layer" means a layer most distant (also referred to as an "outermost surface layer") from the transparent resin layer, in the surface protection layer. Specifically, when the surface protection layer is formed from a single layer, the surface protection layer has a single-layer structure based on the top coat layer. When the surface protection layer is formed from two or more layers, a layer positioned between the top coat layer and the transparent resin layer means a layer other than the top coat layer among layers constituting the surface protection layer. The primer layer shown in FIG. 1 serves as the layer other than the top coat layer.

Examples of the surface protection layer include a top coat layer which typically imparts surface characteristics to the decorative sheet, and a primer layer which is established for improvement in close contact with the transparent resin layer disposed in contact with the surface protection layer, as shown in FIG. 1. These layers are preferably constituted by a resin composition comprising a resin, from the viewpoint of easy formation, etc., and more preferably constituted by a resin composition further comprising weathering agents such as an ultraviolet absorber and a light stabilizer, in consideration of the surface protection layer being the first layer on which ultraviolet ray is incident among the layers constituting the decorative sheet.

(Ultraviolet Absorber)

When the surface protection layer is formed from two or more layers, at least the outermost surface layer, i.e., the top coat layer, preferably contains an ultraviolet absorber. More preferably, all the layers constituting the surface protection layer contain an ultraviolet absorber.

Examples of the ultraviolet absorber preferably include benzotriazole ultraviolet absorbers, benzophenone ultraviolet absorbers, and triazine ultraviolet absorbers. A triazine ultraviolet absorber is more preferred. The triazine ultraviolet absorber is preferably a hydroxyphenyltriazine ultraviolet absorber from the viewpoint of suppressing bleed-out and improving weather resistance.

The ultraviolet absorber is preferably an ultraviolet absorber having absorption performance at or near wavelengths from 270 to 300 nm, or an ultraviolet absorber having absorption performance at or near a wavelength of 310 nm. Use of the ultraviolet absorber having such absorption performance more efficiently attains absorbance $A_{11}$ of 0.6 or more and absorbance $A_{12}$ of 2.7 or more and more easily attains absorbance $A_{21}$ of 0.8 or more and absorbance $A_{22}$ of 1.1 or more. From a viewpoint similar thereto, it is preferred to use an ultraviolet absorber having absorption performance at least at or near wavelengths from 270 to 300 nm, and it is more preferred to use an ultraviolet absorber having absorption performance at or near wavelengths from 270 to 300 nm, and an ultraviolet absorber having absorption performance at or near a wavelength of 310 nm in combination.

Also, an ultraviolet absorber having a reactive functional group such as a (meth)acryloyl group, a vinyl group, or an allyl group is preferred because bleed-out is easily suppressed.

Examples of the ultraviolet absorber having absorption performance at or near wavelengths from 270 to 300 nm preferably include hydroxyphenyltriazine ultraviolet absorbers represented by the following general formula (1):

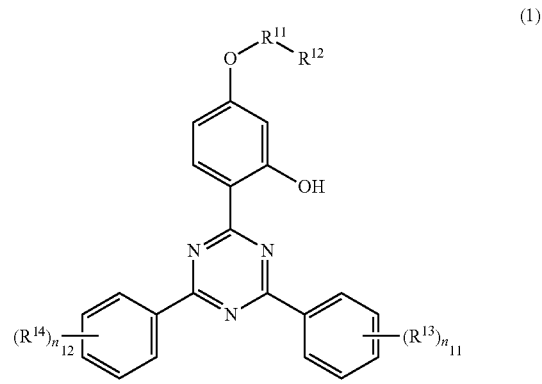

(1)

In the general formula (1), $R^{11}$ is a divalent organic group, $R^{12}$ is an acyloxy group represented by —O—C(=O)$R^{15}$, $R^{13}$, $R^{14}$ and $R^{15}$ are each independently a hydrogen atom or a monovalent organic group, and $n_{11}$ and $n_{12}$ are each independently an integer of 0 to 5. Pluralities of $R^{13}$ and $R^{14}$ moieties, if present, may be the same or different.

Examples of the divalent organic group of $R^{11}$ include aliphatic hydrocarbon groups such as alkylene groups and alkenylene groups. An alkylene group is preferred from the viewpoint of weather resistance. The number of its carbon atoms is preferably 1 or more, more preferably 2 or more. The upper limit is preferably 16 or less, more preferably 12 or less, further preferably 8 or less, particularly preferably 4 or less. Such an aliphatic hydrocarbon group may be linear, branched, or cyclic , from the viewpoint of weather resistance, it is preferably linear or branched, more preferably linear.

Each of $R^{13}$ and $R^{14}$ is preferably a hydrogen atom from the viewpoint of weather resistance. When each of $R^{13}$ and $R^{14}$ is a monovalent organic group, examples thereof preferably include alkyl groups, alkenyl groups, cycloalkyl groups, aryl groups, and arylalkyl groups. An aromatic hydrocarbon group such as an aryl group or an arylalkyl group is preferred, the aryl group is more preferred, among which a phenyl group is especially preferred, from the viewpoint of weather resistance.

$R^{15}$ is preferably a monovalent organic group from the viewpoint of weather resistance. Examples thereof preferably include alkyl groups, alkenyl groups, cycloalkyl groups, aryl groups, and arylalkyl groups. An aliphatic hydrocarbon group such as an alkyl group or an alkenyl group is more preferred, and an alkyl group is further preferred, from the viewpoint of weather resistance. When the monovalent organic group of $R^{15}$ is an aliphatic hydrocarbon group such as an alkyl group or an alkenyl group, the aliphatic hydrocarbon group may be linear, branched, or cyclic and is preferably linear or branched from the viewpoint of weather resistance. The number of its carbon atoms is preferably 2 or more, more preferably 4 or more, from the viewpoint of weather resistance. The upper limit is preferably 16 or less, more preferably 12 or less, further preferably 10 or less.

Examples of the ultraviolet absorber having absorption performance at or near a wavelength of 310 nm preferably include hydroxyphenyltriazine ultraviolet absorbers represented by the following general formula (2):

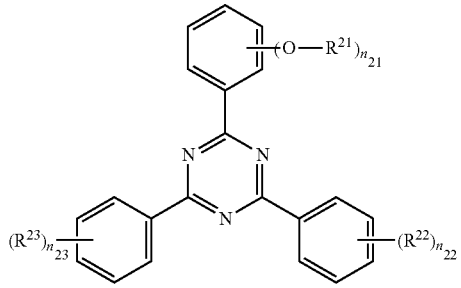

(2)

In the general formula (2), $R^{21}$ is a hydrogen atom or a monovalent organic group, $R^{22}$ and $R^{23}$ are each independently a hydroxy group or a monovalent organic group, and $n_{21}$, $n_{22}$ and $n_{23}$ are each independently an integer of 1 to 5. Pluralities of $R^{21}$, $R^{22}$ and $R^{23}$ moieties, if present, may be the same or different.

Examples of the monovalent organic group of $R^{21}$, $R^{22}$ and $R^{23}$ preferably include those listed as examples of the monovalent organic group of $R^{13}$ and $R^{14}$ in the general formula (1). An aliphatic hydrocarbon group such as an alkyl group or an alkenyl group is more preferred, and an alkyl group is further preferred, from the viewpoint of weather resistance. In this case, the monovalent organic group of $R^{21}$, $R^{22}$ and $R^{23}$ may be linear, branched, or cyclic and is preferably linear or branched, more preferably linear, from the viewpoint of weather resistance. The number of its carbon atoms is preferably 2 or more, more preferably 3 or more, the upper limit is preferably 16 or less, more preferably 12 or less, further preferably 8 or less, from the viewpoint of weather resistance.

Each of $n_{21}$, $n_{22}$ and $n_{23}$ is preferably 2 or more. Pluralities of $R^{21}$, $R^{22}$ and $R^{23}$ moieties may be the same or different. A plurality of $R^{21}$ moieties are preferably the same, and $R^{22}$ and $R^{23}$ are preferably different, from the viewpoint of weather resistance. One of different $R^{22}$ and $R^{23}$ is preferably a hydrogen atom. When $R^{21}$, $R^{22}$ and $R^{23}$ are monovalent organic groups, these organic groups are preferably the same.

The content of the ultraviolet absorber in the surface protection layer is not particularly limited as long as absorbance $A_{11}$ of 0.6 or more and absorbance $A_{12}$ of 2.7 or more are feasible.

The content of the ultraviolet absorber in the top coat layer constituting the surface protection layer is preferably 0.3 parts by mass or more and 15.0 parts by mass or less, more preferably 0.5 parts by mass or more and 12.5 parts by mass or less, further preferably 1.0 part by mass or more and 10.0 parts by mass or less, still further preferably 2.0 parts by mass or more and 5.5 parts by mass or less, with respect to 100 parts by mass of the resin constituting the top coat layer in consideration of the obtainment of excellent weather resistance by absorbance $A_{11}$ of 0.6 or more and absorbance $A_{12}$ of 2.7 or more, and also the suppression of bleed-out.

When an additional layer, such as a primer layer, constituting the surface protection layer contains an ultraviolet absorber, a preferred range of the content of the ultraviolet absorber in the additional layer is preferably 0.5 parts by mass or more and 10.0 parts by mass or less, more preferably 1.0 part by mass or more and 9.5 parts by mass or less, further preferably 2.0 parts by mass or more and 9.0 parts by mass or less, still further preferably 5.0 parts by mass or more and 8.5 parts by mass or less, with respect to 100 parts by mass of the resin constituting the additional layer.

(Light Stabilizer)

When the surface protection layer is formed from two or more layers, at least the top coat layer preferably contains a light stabilizer. More preferably, all the layers constituting the surface protection layer contain a light stabilizer.

The light stabilizer is preferably a hindered amine light stabilizer.

Examples of the hindered amine light stabilizer include 4-benzoyloxy-2,2,6,6-tetramethylpiperidine, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidinyl) sebacate, bis(1,2,2,6,6-pentamethyl-4-piperidinyl) sebacate, methyl(1,2,2,6,6-pentamethyl-4-piperidinyl) sebacate, 2,4-bis[N-butyl-N-(1-cyclohexyloxy-2,2,6,6-tetramethyl-4-piperidinyl)amino]-6-(2-hydroxyethylamine)-1,3,5-triazine), tetrakis(1,2,2,6,6-pentamethyl-4-piperidyl)-1,2,3,4-butane tetracarboxylate, and bis-(1,2,2,6,6-pentamethyl-4-piperidyl)-2-(3,5-di-t-butyl-4-hydroxy-benzyl)-2-n-butyl malonate. Among them, a hindered amine light stabilizer derived from decanedioic acid (sebacic acid), such as bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidinyl) sebacate, bis(1,2,2,6,6-pentamethyl-4-piperidinyl) sebacate, or methyl(1,2,2,6,6-pentamethyl-4-piperidinyl) sebacate, and a hindered amine light stabilizer having a reactive functional group, such as 1,2,2,6,6-pentamethyl-4-piperidinyl (meth)acrylate, are preferred.

Among those described above, a hindered amine light stabilizer having a (meth)acryloyl group, and a light stabilizer having a reactive functional group, such as a vinyl group or an allyl group, other than the (meth)acryloyl group are more preferred because bleed-out is easily suppressed.

The content of the light stabilizer in the top coat layer constituting the surface protection layer is preferably 0.1 parts by mass or more and 10.0 parts by mass or less, more preferably 0.5 parts by mass or more and 8.0 parts by mass or less, further preferably 1 part by mass or more and 6.0 parts by mass or less, still further preferably 1.5 parts by mass or more and 4.0 parts by mass or less, with respect to 100 parts by mass of the resin constituting the top coat layer in consideration of the obtainment of excellent weather resistance by absorbance $A_{11}$ of 0.6 or more and absorbance $A_{12}$ of 2.7 or more, and also the suppression of bleed-out.

When an additional layer, such as a primer layer, constituting the surface protection layer contains a light stabilizer, a preferred range of the content of the light stabilizer in the additional layer is the same as that of the content of the light stabilizer in the top coat layer.

(Nanoshelling of Ultraviolet Absorber and Light Stabilizer)

The weathering agent, such as the ultraviolet absorber or the light stabilizer, used in the present embodiment may be enclosed in a nanoshell and thereby nanoshelled. Use of the ultraviolet absorber or the light stabilizer enclosed in a nanoshell can homogenize the effect of weather resistance in the layer by improving the dispersion property (compatibility) of the resin with the ultraviolet absorber or the light stabilizer in the surface protection layer, and can also improve mechanical strength. The link between the nanoshell and the resin of the surface protection layer is expected to suppress the bleed-out of the ultraviolet absorber or the light stabilizer. In the present embodiment, only the ultraviolet absorber may be nanoshelled for use, or only the light stabilizer may be nanoshelled for use. Alternatively, both the ultraviolet absorber and the light stabilizer may be nanoshelled for use. Preferably, both the ultraviolet absorber and the light stabilizer are nanoshelled for use from the viewpoint of the suppression of bleed-out.

The "nanoshell" is a "hollow vesicle having a membrane structure closed in a nanosized shell shape".

The average primary particle size of the nanoshell enclosing the ultraviolet absorber or the light stabilizer is less than a visible light wavelength region (380 to 780 nm) and is on the order of 1/2 or less of the visible light wavelengths, i.e., less than 380 nm. More specifically, the average primary particle size is preferably 1 nm or more and less than 380 nm, more preferably 1 to 375 nm, further preferably 5 to 300 nm, still further preferably 10 to 250 nm, particularly preferably 15 to 200 nm.

The average primary particle size is a value calculated by statistical processing from observation images measured under various electron microscopes such as a transmission electron microscope (TEM), a scanning electron microscope (SEM), or a scanning transmission electron microscope (STEM). The calculation by statistical processing is specifically performed, for example, by calculation according to the expression (A) given below when the diameters of 1000 particles randomly selected from SEM images are measured and prepared into histograms of 3-nm segments. Number-average primary particle size $D_{np}$ obtained according to the expression (A) is regarded as the average primary particle size of the present specification.

$$D_{np} = \Sigma n_i d_i / \Sigma n_i \quad (A)$$

$D_{np}$: Number-average primary particle size
$d_i$: ith diameter of a histogram
$n_i$: Frequency The nanoshell is not particularly limited as long as the nanoshell can enclose the ultraviolet absorber or the light stabilizer. The nanoshell may be a single-layer membrane or may be multiple membranes. A single-layer membrane is preferred from the viewpoint of attaining a smaller average primary particle size and improving a dispersion property (compatibility). Phospholipid is preferred as a material to form the nanoshell. Specifically, the form of the nanoshell is more preferably a single-layer membrane comprising phospholipid.

Examples of the phospholipid include: glycerophospholipid such as phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soybean lecithin, and hydrogenated soybean lecithin; and sphingophospholipid such as sphingomyelin, ceramide phosphorylethanolamine, and ceramide phosphorylglycerol. These phospholipids can be used singly or in combination of two or more thereof.

Examples of the approach for enclosing the ultraviolet absorber or the light stabilizer in the nanoshell include a Bangham method, an extrusion method, a hydration method, a surfactant dialysis method, a reverse phase evaporation method, a freezing-thawing method, and a supercritical reverse phase evaporation method.

The Bangham method is a method which involves adding and dissolving phospholipid in a solvent such as chloroform or methanol, then removing the solvent using an evaporator to form a thin membrane comprising the phospholipid, and adding an ultraviolet absorber or a light stabilizer thereto, followed by stirring by high-speed rotation on the order of, for example, 1000 to 2500 rpm using a mixer for hydration and dispersion so that the ultraviolet absorber or the light stabilizer is enclosed in a nanoshell. The extrusion method is a method which involves passing through a filter instead of using the mixer as external perturbation. The hydration method is a method which involves performing mild stirring and dispersion without the use of the mixer in the Bangham method so that the ultraviolet absorber or the light stabilizer is enclosed in a nanoshell. The reverse phase evaporation method is a method which involves dissolving phospholipid in a solvent such as diethyl ether or chloroform, adding an ultraviolet absorber or a light stabilizer (which may be in the state of a liquid dispersion) thereto to form a W/O emulsion, removing the solvent under reduced pressure from the emulsion, and adding water to the residue so that the ultraviolet absorber or the light stabilizer is enclosed in a nanoshell. The freezing-thawing method is a method which involves performing at least any of cooling and heating as external perturbation, and enclosing the ultraviolet absorber or the light stabilizer in a nanoshell by repeating cooling and heating.

The nanoshell can be prepared more reliably and more easily as a single-layer membrane comprising phospholipid by the adoption of the supercritical reverse phase evaporation method. The supercritical reverse phase evaporation method is a method, as described in, for example, JP 2016-137585 A, which involves enclosing a crystal nucleating agent in a nanoshell using carbon dioxide in a supercritical state or under temperature or pressure conditions equal to or more than the critical point. In this context, the carbon dioxide in a supercritical state means carbon dioxide in a supercritical state equal to or more than the critical temperature (30.98° C.) and the critical pressure (7.3773±0.0030 MPa). The carbon dioxide under temperature or pressure conditions equal to or more than the critical point means carbon dioxide under conditions where only one of the temperature and the pressure exceeds critical conditions.

The supercritical reverse phase evaporation method specifically involves adding water to a mixture of an ultraviolet absorber or a light stabilizer, supercritical carbon dioxide, and phospholipid, stirring the resultant to form an emulsion of the supercritical carbon dioxide and an aqueous phase, and subsequently expanding and evaporating carbon dioxide under reduced pressure for phase inversion so that a nanoshell of the ultraviolet absorber or the light stabilizer surface-covered with a single-layer membrane of the phospholipid is formed to obtain the ultraviolet absorber or the light stabilizer enclosed in the nanoshell. In the case of forming multiple membranes as conventionally practiced, supercritical carbon dioxide can be added to a mixture of an ultraviolet absorber or a light stabilizer, phospholipid, and water in the method described above.

(Nanoshelling of Dispersant)

In the present embodiment, the surface protection layer may contain a dispersant enclosed in a nanoshell. The surface protection layer containing the dispersant enclosed in a nanoshell can homogenize the effect of weather resistance in the layer by improving the dispersion property (compatibility) of the resin with the ultraviolet absorber or the light stabilizer in the surface protection layer, and can also improve mechanical strength.

Examples of the dispersant used in the present embodiment include: polymer surfactants having a molecular weight on the order of 10,000 to 500,000, preferably 15,000 to 300,000, more preferably 20,000 to 200,000, such as aliphatic polyvalent polycarboxylic acid, alkylamine polycarboxylate, and poly(meth)acrylic acid; fatty acid metal salts of a metal such as lithium, sodium, potassium, magnesium, calcium, barium, zinc, or aluminum bound with a saturated or unsaturated fatty acid having preferably 10 to 30, more preferably 12 to 28 carbon atoms, such as lauric acid, myristic acid, stearic acid, behenic acid, montanic acid, or ricinoleic acid; silane coupling agents including (meth) acryloxy silane coupling agents such as (meth)acryloxypropyltriethoxysilane and (meth)acryloxypropyltrimethoxysilane, vinyl silane coupling agents such as vinyltriethoxysilane and vinyltrimethoxysilane, epoxy silane coupling agents such as (epoxycyclohexyl)ethyltrimethoxysilane and glycidoxypropyltrimethoxysilane, isocyanato silane coupling agents such as isocyanatopropyltriethoxysilane, and phenyl silane coupling agents such as phenyltrimethoxysilane; titanate coupling agents such as tetrakis[bis(allyloxymethyl)butoxy]titanium, dipropoxy titanium diisostearate, (butoxycarbonylbenzoyloxy)tributoxy titanium, isopropyl titanium triisostearate, dibutoxy-bis(triethanolaminato)titanium, tetrakis(ethylhexyloxy)titanium, and dipropoxy-bis(acetylacetonato)titanium; silicone oils such as dimethyl silicone oil, methylphenyl silicone oil, methyl hydrogen silicone oil, cyclic dimethyl silicone oil, alkyl-modified silicone oil, long-chain alkyl-modified silicone oil, and higher fatty acid-modified silicone oil; waxes including hydrocarbon waxes such as polypropylene wax, polyethylene wax, polypropylene-polyethylene copolymer wax, microcrystalline wax, paraffin wax, Fischer-Tropsch wax, and Sasol wax, and deoxidized waxes such as ester wax of fatty acid carboxylic acid having preferably 10 to 30, more preferably 12 to 24 carbon atoms and dipentaerythritol, carnauba wax, and montan wax; and modified resins of polyolefin resin modified with an organic acid such as maleic acid, sulfonic acid, carboxylic acid, or rosin acid.

Embodiments of the size of the dispersant enclosed in a nanoshell and the material for the nanoshell are the same as the embodiments about the ultraviolet absorber or the light stabilizer enclosed in a nanoshell. The approach for enclosing the dispersant in the nanoshell can adopt the same approach as that for enclosing the ultraviolet absorber or the light stabilizer in the nanoshell.

(Top Coat Layer and Resin to Form Top Coat Layer)

The top coat layer preferably comprises a cured product of a curable resin composition from the viewpoint of improving the surface characteristics, such as abrasion resistance, of the decorative sheet.

In the top coat layer, the ratio of the curable resin contained in the curable resin composition to all resin components constituting the top coat layer is preferably 50% by mass or more, more preferably 70% by mass or more, further preferably 90% by mass or more, still further preferably 100% by mass, which means that the top coat layer is a layer composed of a cured product of the curable resin composition comprising the curable resin, from the viewpoint of obtaining much better surface characteristics.

Examples of the curable resin composition include thermosetting resin compositions comprising a thermosetting resin, ionizing radiation curable resin compositions comprising an ionizing radiation curable resin, and mixtures thereof. Among them, an ionizing radiation curable resin composition is preferred from the viewpoint of elevating the cross-link density of the top coat layer and improving surface characteristics such as abrasion resistance, and an electron beam curable resin composition is more preferred from the viewpoint of feasible solvent-free application and easy handling.

The thermosetting resin composition is a composition comprising at least a thermosetting resin and is a resin composition that is cured by heating. Examples of the thermosetting resin include acrylic resin, urethane resin, phenol resin, urea-melamine resin, epoxy resin, unsaturated polyester resin, and silicone resin. In the thermosetting resin composition, such a curable resin is supplemented, if necessary, with a curing agent.

(Ionizing Radiation Curable Resin)

The ionizing radiation curable resin composition is a composition comprising a compound having an ionizing radiation curable functional group (hereinafter, also referred to as an "ionizing radiation curable compound"). The ionizing radiation curable functional group is a group that is cross-linked for curing by irradiation with ionizing radiation. Examples thereof preferably include functional groups having an ethylenic double bond, such as a (meth)acryloyl group, a vinyl group, and an allyl group. The ionizing radiation means electromagnetic wave or charged particle radiation having an energy quantum capable of polymerizing or cross-linking molecules. Usually, ultraviolet ray (UV) or electron beam (EB) is used. The ionizing radiation additionally includes electromagnetic wave such as X ray and γ ray, and charged particle radiation such as α ray and ion line.

Specifically, the ionizing radiation curable compound can be appropriately selected, for use, from among polymerizable monomers and polymerizable oligomers commonly used as conventional ionizing radiation curable resins.

The polymerizable monomer is preferably a (meth)acrylate monomer having a radical polymerizable unsaturated group in the molecule, particularly preferably a polyfunctional (meth)acrylate monomer.

Examples of the polyfunctional (meth)acrylate monomer include (meth)acrylate monomers having two or more ionizing radiation curable functional groups in the molecule and having at least a (meth)acryloyl group as the functional group.

The number of functional groups in the polyfunctional (meth)acrylate monomer is preferably 2 or more and 8 or less, more preferably 2 or more and 6 or less, further preferably 2 or more and 4 or less, still further preferably 2 or more and 3 or less, from the viewpoint of improving weather resistance, and surface characteristics such as abrasion resistance. These polyfunctional (meth)acrylates may be used singly or in combination of two or more thereof.

Examples of the polymerizable oligomer include (meth) acrylate oligomers having two or more ionizing radiation curable functional groups in the molecule and having at least a (meth)acryloyl group as the functional group. Examples thereof include urethane (meth)acrylate oligomers, epoxy (meth)acrylate oligomers, polyester (meth)acrylate oligomers, polyether (meth)acrylate oligomers, polycarbonate (meth)acrylate oligomers, and acrylic (meth)acrylate oligomers.

These polymerizable oligomers may be used singly or in combination of two or more thereof. The polymerizable oligomer is preferably a urethane (meth)acrylate oligomer, an epoxy (meth)acrylate oligomer, a polyester (meth)acrylate oligomer, a polyether (meth)acrylate oligomer, a polycarbonate (meth)acrylate oligomer, or an acrylic (meth) acrylate oligomer, more preferably a urethane (meth) acrylate oligomer or a polycarbonate (meth)acrylate oligomer, further preferably a urethane (meth)acrylate oligomer, from the viewpoint of improving processing characteristics, abrasion resistance and weather resistance.

The number of functional groups in such a polymerizable oligomer is preferably 2 or more and 8 or less, the upper limit is more preferably 6 or less, further preferably 4 or less, still further preferably 3 or less, from the viewpoint of improving processing characteristics, abrasion resistance and weather resistance.

The weight-average molecular weight of such a polymerizable oligomer is preferably 2,500 or larger and 7,500 or smaller, more preferably 3,000 or larger and 7,000 or smaller, further preferably 3,500 or larger and 6,000 or smaller, from the viewpoint of improving processing characteristics, abrasion resistance and weather resistance. In this context, the weight-average molecular weight is an average molecular weight that is measured by GPC analysis and calculated on the basis of standard polystyrene.

The ionizing radiation curable resin composition can be used in combination with monofunctional (meth)acrylate for the purpose of, for example, decreasing the viscosity of the ionizing radiation curable resin composition. Such monofunctional (meth)acrylates may be used singly or in combination of two or more thereof.

The thickness of the top coat layer is preferably 1.5 μm or larger and 20 μm or smaller, more preferably 2 μm or larger and 15 μm or smaller, further preferably 3 μm or larger and 10 μm or smaller, from the viewpoint of the balance among processing characteristics, abrasion resistance and weather resistance.

(Primer Layer and Resin to Form Primer Layer)

The decorative sheet of the present invention preferably has a primer layer, in addition to the top coat layer, on the transparent resin layer side relative to the top coat layer in the surface protection layer. The primer layer can improve the close contact between the top coat layer and the transparent resin layer.

The primer layer is a layer that is preferably constituted by at least a binder resin and may further contain a weathering agent such as an ultraviolet absorber or a light stabilizer, if necessary. The primer layer is preferably constituted by a resin composition comprising at least a binder resin and is preferably a layer formed from a resin composition further comprising a weathering agent such as an ultraviolet absorber or a light stabilizer.

Examples of the binder resin preferably include resins such as urethane resin, acrylic polyol resin, acrylic resin, ester resin, amide resin, butyral resin, styrene resin, urethane-acrylic copolymers, polycarbonate urethane-acrylic copolymers (urethane-acrylic copolymers derived from a polymer (polycarbonate polyol) having a carbonate bond in the polymer backbone and having two or more hydroxy groups at an end and/or a side chain), vinyl chloride-vinyl acetate copolymer resin, vinyl chloride-vinyl acetate-acrylic copolymer resin, chlorinated propylene resin, nitrocellulose resin (soluble nitrocellulose), and cellulose acetate resin. These resins can be used singly or in combination of two or more thereof. For example, a mixture of a polycarbonate urethane-acrylic copolymer and acrylic polyol resin can be used as the binder resin.

The thickness of the primer layer is preferably 1 μm or larger and 10 μm or smaller, more preferably 2 μm or larger and 8 μm or smaller, further preferably 3 μm or larger and 6 μm or smaller.

The resin constituting the surface protection layer is preferably substantially free from polycarbonate resin. In the present invention, light (ultraviolet ray) at wavelengths from 270 to 300 nm, preferably a wavelength of 310 nm, reaching the transparent resin layer is sufficiently limited by defining absorbance $A_{11}$, preferably absorbance $A_{21}$, which is an absorbance for the surface protection layer. However, light (ultraviolet ray) at wavelengths from 270 to 300 nm, and a wavelength of 310 nm reaches the surface protection layer itself in a larger amount than that for the transparent resin layer. Hence, the resin constituting the surface protection layer, substantially free from polycarbonate resin is preferred because the surface protection layer easily has much better weather resistance.

The phrase "substantially free from polycarbonate resin" means that the ratio of the polycarbonate resin to all resin components constituting the surface protection layer is 1% by mass or less, preferably 0.1% by mass or less, more preferably 0.01% by mass or less, further preferably 0% by mass.

<Transparent Resin Layer>

The transparent resin layer is a layer disposed between the surface protection layer and the base material layer, and is a layer that imparts performance such as weather resistance, surface characteristics (e.g., abrasion resistance), and processing suitability to the decorative sheet of the present invention. When the decorative sheet of the present invention has a decoration layer mentioned later, the transparent resin layer disposed between the decoration layer and the surface protection layer also has a function of protecting the decoration layer.

In the decorative sheet of the present invention, at least one of the transparent resin layer and the base material layer is constituted by a resin composition comprising a resin having an ultraviolet absorption wavelength at least at 270 to 300 nm. Accordingly, examples of the resin contained in the resin composition constituting the transparent resin layer preferably include resins having an ultraviolet absorption wavelength at least at 270 to 300 nm.

The content of the resin having an ultraviolet absorption wavelength at least at 270 to 300 nm in the transparent resin layer is preferably 50% by mass or more, more preferably 70% by mass or more, further preferably 90% by mass or more, still further preferably 100% by mass, with respect to all resin components of the transparent resin layer from the viewpoint of mechanical strength, processing suitability, etc.

Examples of the resin having an ultraviolet absorption wavelength at least at 270 to 300 nm preferably include polyester resin such as polyethylene terephthalate, and polycarbonate resin. These resins can be used singly or in combination of two or more thereof.

The resin constituting the transparent resin layer may be used in combination with an additional resin, in addition to the resin having an ultraviolet absorption wavelength at least at 270 to 300 nm. Examples of the additional resin include polyolefin resin such as polyethylene resin (low-density, medium-density, and high-density), polypropylene resin, polymethylpentene resin, and polybutene resin, resins containing polyolefin, such as ethylene-vinyl acetate copolymers and ethylene-acrylic acid copolymers, and thermoplastic resins such as polyester resin, acrylonitrile-butadiene-styrene resin (hereinafter, also referred to as "ABS resin"), acrylic resin, and polyvinyl chloride resin.

In the decorative sheet of the present invention, at least one of the base material layer and the transparent resin layer can be constituted by a resin composition comprising a resin having an ultraviolet absorption wavelength at least at 270 to 300 nm. Therefore, the transparent resin layer may not be constituted by the resin composition comprising the resin and may be constituted by, for example, a resin composition comprising the additional resin, as long as for example, the base material layer is constituted by the resin composition comprising the resin.

In this case, the additional resin is preferably polyolefin resin such as polyethylene resin (low-density, medium-density, and high-density) or polypropylene resin, or polyvinyl chloride resin. This is because the water vapor transmission rate of the decorative sheet mentioned later easily falls within a predetermined range, and therefore, construction suitability as well as long-term close contact can be improved.

Examples of the polyolefin resin more specifically include: homopolymers of olefins such as ethylene, propylene, and butene; various copolymers such as ethylene-propylene block copolymers and random copolymers; copolymers of at least one of ethylene and propylene with at least one additional olefin such as butene, pentene, or hexene; and copolymers of at least one of ethylene and propylene with at least one additional monomer such as vinyl acetate or vinyl alcohol.

Among them, polyethylene resin containing ethylene as a constituent unit or polypropylene resin containing propylene as a constituent unit is preferred, and polypropylene resin is more preferred, from the viewpoint that a water vapor transmission rate mentioned later easily falls within a predetermined range and from the viewpoint of improving construction suitability as well as long-term close contact.

More specifically, the polyethylene resin may be a homopolymer of ethylene, i.e., polyethylene, or may be a copolymer of ethylene with an additional comonomer (e.g., α-olefin such as propylene, 1-butene, 1-hexene, and 1-octene; and vinyl acetate and vinyl alcohol) copolymerizable with ethylene. Examples of the polyethylene include high-density polyethylene (HDPE), medium-density polyethylene (MDPE), low-density polyethylene (LDPE) as well as linear low-density polyethylene (LLDPE), very low-density polyethylene (VLDPE), ultrahigh-molecular-weight polyethylene (UHMWPE), and cross-linked polyethylene (PEX). These polyethylene resins may be used singly or may be used in combination of two or more thereof.

The polypropylene resin may be a homopolymer of propylene, i.e., polypropylene, or may be a copolymer of propylene with an additional comonomer (e.g., α-olefin such as ethylene, 1-butene, 1-hexene, and 1-octene; and vinyl acetate and vinyl alcohol) copolymerizable with propylene. These polypropylene resins may be used singly or may be used in combination of two or more thereof.

In the case of using a homopolymer of propylene (polypropylene), the water vapor transmission rate of the transparent resin layer can be adjusted by the adjustment of the degree of crystallinity. In general, the water vapor transmission rate of polypropylene resin tends to be decreased as the degree of crystallinity is elevated. In the case of using the above polypropylene resin having a thickness in the range of 40 μm or larger and 200 μm or smaller as the transparent resin layer, its degree of crystallinity is preferably 30% or more, more preferably 40% or more. The upper limit is preferably 80% or less, more preferably 70% or less.

In the case of using a homopolymer of propylene (polypropylene), the water vapor transmission rate of the transparent resin layer can also be adjusted by the adjustment of the mass ratio between isotactic polypropylene and atactic polypropylene. In general, the water vapor transmission rate of the transparent resin layer can be decreased by the addition of isotactic polypropylene, as compared with the case where the ratio of atactic polypropylene in the polypropylene is 100% by mass. In this case, the mass ratio between atactic polypropylene and isotactic polypropylene is preferably 0/100 to 20/80 in consideration of easy adjustment of a water vapor transmission rate.

A homopolymer of a vinyl chloride monomer, i.e., polyvinyl chloride, or a copolymer of a vinyl chloride monomer with a monomer copolymerizable with the vinyl chloride monomer may be used as the vinyl chloride resin.

Examples of the monomer copolymerizable with the vinyl chloride monomer include: vinyl esters such as vinyl acetate and vinyl propionate; acrylic acid esters such as methyl acrylate and butyl acrylate; methacrylic acid esters such as methyl methacrylate and ethyl methacrylate; maleic acid esters such as butyl maleate and diethyl maleate; fumaric acid esters such as dibutyl fumarate and diethyl fumarate; vinyl ethers such as vinyl methyl ether, vinyl butyl ether and vinyl octyl ether; vinyl cyanides such as acrylonitrile and methacrylonitrile; olefins such as ethylene, propylene, butylene, and styrene; dienes such as isoprene and butadiene; vinylidene halides and vinyl halides, other than vinyl chloride, such as vinylidene chloride and vinyl bromide; and allyl phthalates such as diallyl phthalate. These monomers may be used singly or in combination of two or more thereof.

The average degree of polymerization of the vinyl chloride resin is preferably 500 to 4000, more preferably 700 to 3900, further preferably 1000 to 3800, from the viewpoint that a water vapor transmission rate mentioned later easily falls within a predetermined range and from the viewpoint of improving construction suitability as well as long-term close contact. When the average degree of polymerization falls within the range described above, excellent mechanical strength and moldability are also obtained. In the present specification, the average degree of polymerization is an average degree of polymerization measured in accordance with JIS K6721.

In the present embodiment, in the case of using vinyl chloride resin, a plasticizer is preferably added from the viewpoint that a water vapor transmission rate easily falls within the range described above, from the viewpoint of improving construction suitability as well as long-term close contact, and from the viewpoint of improving workability.

The plasticizer is not particularly limited as long as the plasticizer has compatibility with the vinyl chloride resin. Examples thereof include: phthalic acid plasticizers such as dibutyl phthalate (DBP), dioctyl phthalate (DOP), diisononyl phthalate (DINP), diisodecyl phthalate (DIDP), and diundecyl phthalate (DUP); adipic acid plasticizers such as dibutyl adipate; phosphoric acid plasticizers such as tributyl phosphate, tricresyl phosphate, and triphenyl phosphate; trimellitic acid plasticizers such as tributyl trimellitate and trioctyl trimellitate; various known polyester plasticizers such as adipic acid polyester; and citric acid esters such as acetyl tributyl citrate and acetyl trioctyl citrate. Among them, a phthalic acid plasticizer, an adipic acid plasticizer, and a polyester plasticizer are preferred, and a phthalic acid plasticizer and a polyester plasticizer are more preferred, from the viewpoint that a water vapor transmission rate easily falls within the range described above, from the viewpoint of improving construction suitability as well as long-term close contact, and from the viewpoint of improving workability. These plasticizers may be used singly or in combination of two or more thereof.

The content of the plasticizer can be appropriately adjusted, for use, according to the desired water vapor transmission rate, and cannot be generalized. Usually, the water vapor transmission rate of the vinyl chloride resin tends to be increased as the amount of the plasticizer added is increased. In consideration of this, the content is preferably 15 parts by mass or more, more preferably 20 parts by mass or more, further preferably 25 parts by mass or more, the upper limit is preferably 50 parts by mass or less, more preferably 45 parts by mass or less, further preferably 35 parts by mass or less, with respect to 100 parts by mass of the vinyl chloride resin. When the content of the plasticizer falls within the range described above, a water vapor transmission rate is easily adjusted to the desired range and construction suitability as well as long-term close contact can be improved. When the content of the plasticizer is 20 parts by mass or more, the vinyl chloride resin is softened so that workability can be improved. On the other hand, when the content is 50 parts by mass or less, the bleed-out of the plasticizer is suppressed. Thus, a water vapor transmission rate is easily adjusted to the desired range stably, and construction suitability as well as long-term close contact can be improved.

In the case of using, for example, a phthalic acid ester plasticizer, its content is preferably 25 parts by mass or more, more preferably 30 parts by mass or more, further preferably 35 parts by mass or more, the upper limit is preferably 50 parts by mass or less, more preferably 45 parts by mass or less, further preferably 40 parts by mass or less, with respect to 100 parts by mass of the vinyl chloride resin, particularly, from the viewpoint that a water vapor transmission rate easily falls within the desired range and from the viewpoint of improving construction suitability as well as long-term close contact. In the case of using a polyester plasticizer, its content is preferably 15 parts by mass or more, more preferably 18 parts by mass or more, further preferably 20 parts by mass or more, with respect to 100 parts by mass of the vinyl chloride resin. The upper limit is preferably 35 parts by mass or less, more preferably 30 parts by mass or less, further preferably 25 parts by mass or less.

The transparent resin layer preferably contains a weathering agent such as an ultraviolet absorber or a light stabilizer. The transparent resin layer containing such a weathering agent easily attains, particularly, absorbance $A_{12}$ of 2.7 or more, by combination with the surface protection layer and easily attains absorbance $A_{22}$ of 1.1 or more. Therefore, weather resistance is improved. As described above, the transparent resin layer is preferably constituted by a resin composition comprising a resin having an ultraviolet absorption wavelength at least at 270 to 300 nm, and is a layer capable of absorbing ultraviolet ray owing to the resin. However, resin degradation progresses by the ultraviolet absorption owing to the resin. Accordingly, these weathering agents contained therein can improve weather resistance and suppress resin degradation.

Examples of the weathering agent such as an ultraviolet absorber or a light stabilizer preferably include those listed as examples of the weathering agent such as an ultraviolet absorber or a light stabilizer that may be used in the surface protection layer.

The content of the ultraviolet absorber in the transparent resin layer is not particularly limited as long as absorbance $A_{12}$ of 2.7 or more is feasible. The content is preferably 0.03 parts by mass or more and 10.0 parts by mass or less, more preferably 0.05 parts by mass or more and 5.0 parts by mass or less, further preferably 0.07 parts by mass or more and 1.0 part by mass or less, still further preferably 0.10 parts by mass or more and 0.50 parts by mass or less, with respect to 100 parts by mass of the resin constituting the transparent resin layer from the viewpoint of obtaining excellent weather resistance by absorbance $A_{12}$ of 2.7 or more, preferably absorbance $A_{22}$ of 1.1 or more.

From a viewpoint similar thereto, the content of the light stabilizer in the transparent resin layer is preferably 0.1 parts by mass or more and 10.0 parts by mass or less, more preferably 0.5 parts by mass or more and 8.0 parts by mass or less, further preferably 1.0 part by mass or more and 5.0 parts by mass or less, still further preferably 1.5 parts by mass or more and 3.0 parts by mass or less, with respect to 100 parts by mass of the resin constituting the transparent resin layer.

The transparent resin layer can be transparent to an extent that the base material layer side relative to the transparent resin layer can be viewed. The transparent resin layer may be clear, colorless or may be colored transparent or translucent. Specifically, in the present invention, the "transparency" is meant to include a clear, colorless state as well as a colored transparent state and a translucent state.

The thickness of the transparent resin layer is preferably 20 µm or larger and 150 µm or smaller, more preferably 40 µm or larger and 120 µm or smaller, further preferably 60 µm or larger and 100 µm or smaller, from the viewpoint of the balance among abrasion resistance, processing suitability and weather resistance.

The transparent resin layer is preferably thicker than the base material layer from the viewpoint of protecting a decoration layer and obtaining excellent weather resistance, and surface characteristics such as abrasion resistance.

<Base Material Layer>

The base material layer is a layer disposed on the side of the transparent resin layer opposite to the surface protection layer, and is a layer that imparts performance such as mechanical strength and processing suitability to the decorative sheet of the present invention.

In the decorative sheet of the present invention, at least one of the transparent resin layer and the base material layer is constituted by a resin composition comprising a resin having an ultraviolet absorption wavelength at least at 270 to 300 nm. Accordingly, examples of the resin contained in the resin composition constituting the base material layer preferably include resins having an ultraviolet absorption wavelength at least at 270 to 300 nm.

The content of the resin having an ultraviolet absorption wavelength at least at 270 to 300 nm in the base material layer is preferably 50% by mass or more, more preferably 70% by mass or more, further preferably 90% by mass or more, still further preferably 100% by mass, with respect to all resin components of the base material layer from the viewpoint of mechanical strength, processing suitability, etc.

Examples of the resin having an ultraviolet absorption wavelength at least at 270 to 300 nm for use in the base material layer preferably include those listed as examples of the resin having an ultraviolet absorption wavelength at least at 270 to 300 nm that may be used in the transparent resin layer. Examples of the additional resin that may be used in combination with the resin having an ultraviolet absorption wavelength at least at 270 to 300 nm preferably include those listed as examples of the additional resin that may be used in the transparent resin layer.

In the present invention, at least one of the base material layer and the transparent resin layer can be constituted by a resin composition comprising a resin having an ultraviolet absorption wavelength at least at 270 to 300 nm. Therefore, the base material layer may not be constituted by the resin composition comprising the resin and may be constituted by, for example, a resin composition comprising the additional resin, as long as for example, the transparent resin layer is constituted by the resin composition comprising the resin.

In this case, the additional resin is preferably polyolefin resin such as polyethylene resin (low-density, medium-density, and high-density) or polypropylene resin, or polyvinyl chloride resin, as in the transparent resin layer. This is because the water vapor transmission rate of the decorative sheet mentioned later easily falls within a predetermined range, and therefore, construction suitability as well as long-term close contact can be improved. Such polyethylene resin, polypropylene resin, and polyvinyl chloride resin can employ the same as those described as the resins that may be used in the transparent resin layer.

The base material layer may be clear, transparent and is preferably colored from the viewpoint of masking the color of an adherend and improving design, at the time of obtaining a decorative material using the decorative sheet.

In the case of coloring the base material layer, a colorant such as a dye or a pigment can be added into the base material layer. A pigment is preferred because fading is easily suppressed.

Examples of the pigment include: white pigments such as zinc oxide, lead white, lithopone, titanium dioxide, precipitated barium sulfate, and baryte; black pigments such as carbon black iron black and azomethine azo black pigments; red pigments such as red lead and iron oxide red; yellow pigments such as lead yellow, zinc yellow (zinc yellow type 1 and zinc yellow type 2), isoindolinone yellow, and nickel-azo complexes; and blue pigments such as phthalocyanine blue, cobalt blue, ultramarine blue, and Prussian blue (potassium ferrocyanide).

The content of the colorant is preferably 1 part by mass or more and 50 parts by mass or less, more preferably 3 parts by mass or more and 40 parts by mass or less, further preferably 5 parts by mass or more and 30 parts by mass or less, still further preferably 5 parts by mass or more and 20 parts by mass or less, with respect to 100 parts by mass of the resin constituting the base material layer from the viewpoint of masking the color of an adherend.

An additive may be blended, if necessary, into the base material layer. Examples of the additive include inorganic fillers such as calcium carbonate and clay, flame retardants such as magnesium hydroxide, lubricants, foaming agents, and antioxidants. The amount of the additive blended is not particularly limited without particularly inhibiting processing characteristics, and can be appropriately set according to required characteristics, etc.

In the present invention, absorbance A12 of 2.7 or more, preferably absorbance A22 of 1.1 or more, is defined. Therefore, the weather resistance of the base material layer is improved, and the weather resistance of the whole decorative sheet can also be favorable, even if the base material layer contains neither the ultraviolet absorber nor the light stabilizer. When particularly strict weather resistance is required, a weathering agent such as an ultraviolet absorber or a light stabilizer may be contained therein. Further improvement in weather resistance can be expected. In this case, examples of the weathering agent such as ultraviolet absorber or a light stabilizer preferably include those listed as examples of the weathering agent that may be used in the transparent resin layer. Its content is also the same as that for the transparent resin layer.

The thickness of the base material layer is preferably 20 µm or larger and 150 µm or smaller, more preferably 25 µm or larger and 120 µm or smaller, further preferably 30 µm or larger and 100 µm or smaller, still further preferably 40 µm or larger and 80 µm or smaller, from the viewpoint of the balance among mechanical strength, processing suitability, and design.

The base material layer may be subjected, on its one side or both sides, to surface treatment such as physical surface treatment (e.g., an oxidation method and a concavo-convex formation method) or chemical surface treatment in order to enhance close contact with other layers of the decorative sheet or with an adherend, and a primer layer may be formed thereon.

<Decoration Layer>

The decorative sheet of the present invention preferably has a decoration layer at an arbitrary location of the decorative sheet from the viewpoint of improving design. The location where the decoration layer is formed is preferably between the base material layer and the transparent resin layer from the viewpoint of enhancing the weather resistance of the decoration layer.

The decoration layer may be, for example, a colored layer that covers the whole surface (so-called solid colored layer), or may be a picture layer formed by printing various patterns using ink and a printer, or may be a combination thereof.

The ink for use in the decoration layer is an appropriate mixture of a binder resin with a colorant such as a pigment or a dye, an extender pigment, a solvent, a stabilizer, a plasticizer, a catalyst, a curing agent, and the like. The ink for use in the decoration layer may contain the weathering agent such as an ultraviolet absorber or a light stabilizer from the viewpoint of improvement in weather resistance.

Examples of the binder resin for the decoration layer include, but are not particularly limited to, resins such as urethane resin, acrylic polyol resin, acrylic resin, ester resin, amide resin, butyral resin, styrene resin, urethane-acrylic copolymers, vinyl chloride-vinyl acetate copolymer resin, vinyl chloride-vinyl acetate-acrylic copolymer resin, chlorinated propylene resin, nitrocellulose resin, and cellulose acetate resin. Various types of resins can be used, such as one-part curable resins and two-part curable resins involving a curing agent such as an isocyanate compound.

The colorant is preferably a pigment excellent in masking property and weather resistance. Examples of the pigment include the same as those listed as examples of the pigment for the base material layer.

The content of the colorant in the base material layer is preferably 5 parts by mass or more and 90 parts by mass or less, more preferably 15 parts by mass or more and 80 parts by mass or less, further preferably 30 parts by mass or more and 70 parts by mass or less, with respect to 100 parts by mass of the resin constituting the decoration layer.

The thickness of the decoration layer can be appropriately selected according to the desired picture and is preferably 0.5 µm or larger and 20 µm or smaller, more preferably 1 µm or larger and 10 µm or smaller, further preferably 2 µm or larger and 5 µm or smaller, from the viewpoint of masking the ground color of an adherend and improving design.

<Adhesive Layer A>

Adhesive layer A is preferably formed between the base material layer and the transparent resin layer in order to improve the close contact between these layers.

In the case of further having the decoration layer mentioned above between the base material layer and the transparent resin layer, the positional relationship between the adhesive layer A and the decoration layer is not particularly limited. Specifically, the decoration layer and the adhesive layer A may be located in this order from the side closer to the base material layer, or the adhesive layer A and the decoration layer may be located in this order from the side closer to the base material layer.

The adhesive layer A can be constituted by an adhesive, for example, a urethane adhesive, an acrylic adhesive, an epoxy adhesive, or a rubber adhesive. Among these adhesives, a urethane adhesive is preferred from the viewpoint of adhesive power.

Examples of the urethane adhesive include adhesives exploiting two-part curable urethane resins containing various polyol compounds such as polyether polyol, polyester polyol, and acrylic polyol, and curing agents such as various isocyanate compounds.

The thickness of the adhesive layer A is preferably 0.1 µm or larger and 30 µm or smaller, more preferably 1 µm or larger and 15 µm or smaller, further preferably 2 µm or larger and 10 µm or smaller.

(Property of Decorative Sheet)

The decorative sheet of the present invention preferably has a water vapor transmission rate of 0.75 g/m$^2$·24 h or more and 45 g/m$^2$·24 h or less, in addition to the properties related to the absorbances. The decorative sheet having such a water vapor transmission rate is excellent in construction suitability, long-term close contact and processing suitability.

Specifically, when the water vapor transmission rate of the decorative sheet falls within the range described above, initial adhesion strength in a construction process is improved. Therefore, the separation of an end face of the decorative sheet due to insufficient initial adhesion strength, so-called spring-back, can be prevented in construction. Hence, construction efficiency is improved. On the other hand, in the case of preparing the decorative material via an adhesive layer from a decorative sheet and an adherend, mainly the degradation of the adhesive layer between the decorative sheet and the adherend can be suppressed. Therefore, peeling caused by the degradation is suppressed, and long-term close contact is improved without causing peeling even in long-term use. Specifically, when the water vapor transmission rate of the decorative material of the present invention falls within the specific range, improvement in construction suitability resulting from improved initial adhesion strength in a construction process as well as improvement in long-term close contact without causing peeling even in long-term use can be achieved.

The effects brought about by the water vapor transmission rate that falls within the range described above will be described more specifically. When the water vapor transmission rate is 0.75 g/m$^2$·24 h or more, poor adhesion caused by poor curing of an adhesive used in an adhesive layer is prevented in preparing a decorative material by affixing the decorative sheet to an adherend via the adhesive layer. Therefore, initial adhesion strength is improved, and construction suitability is improved. On the other hand, when the water vapor transmission rate is 45 g/m$^2$·24 h or less, the degradation of the base material caused by the influence of moisture in the atmosphere, the wind and rain, and ultraviolet ray from insolation, and the hydrolytic degradation of the adhesive used in the adhesive layer can be suppressed in long-term use. Therefore, the decorative sheet is less likely to be peeled from the adherend, and long-term close contact is improved without causing peeling even in long-term use. Accordingly, the decorative sheet of the present invention has the water vapor transmission rate that falls within the range described above, and can thereby improve construction suitability based on high initial adhesion strength in a construction process and long-term close contact without causing peeling even in long-term use, at the same time.

The water vapor transmission rate is preferably 1.2 g/m$^2$·24 h or more, more preferably 1.5 g/m$^2$·24 h or more, further preferably 2.5 g/m$^2$·24 h or more, still further preferably 4.5 g/m$^2$·24 h or more, the upper limit is preferably 40 g/m$^2$·24 h or less, more preferably 35 g/m$^2$·24 h or less, further preferably 30 g/m$^2$·24 h or less, still further preferably 20 g/m$^2$·24 h or less, from the viewpoint of improving construction suitability as well as long-term close contact.

In the present invention, the water vapor transmission rate can be adjusted, as mentioned above, mainly by the type of the material constituting the base material layer, or in the case of having a transparent resin layer, the type of the material constituting the resin layer, etc.

In the present invention, the water vapor transmission rate can be adjusted, as mentioned above, mainly by the type of the material constituting the base material layer, or in the case of having a transparent resin layer, the type of the material constituting the resin layer, etc.

<Method for Producing Decorative Sheet>

The decorative sheet of the present invention can be produced by, for example, a production method comprising the steps of: laminating a base material layer with a transparent resin layer; and forming a surface protection layer on the transparent resin layer.

The lamination of the base material layer with the transparent resin layer can be performed by pressure-bonding a resin composition constituting the transparent resin layer onto the base material layer by a method such as extrusion lamination, dry lamination, wet lamination, or thermal lamination. In the case of establishing a decoration layer or adhesive layer A between the base material layer and the transparent resin layer, ink or an adhesive for forming the decoration layer or the adhesive layer A can be applied onto the base material layer by a known method such as a gravure printing method, a bar coating method, a roll coating method, a reverse roll coating method, or a comma coating method, and dried and cured, if necessary, to form the layer.

The surface protection layer can be formed by applying a resin composition constituting the surface protection layer onto the transparent resin layer, and curing the resin composition, if necessary. In the case of using a curable resin composition in the formation of a top coat layer, a cured product can be prepared by curing under conditions appropriate for the property of the curable resin. The top coat layer can be formed by applying the curable resin composition onto the transparent resin layer to form an uncured resin layer, and curing the curable resin composition constituting the uncured resin layer by a predetermined curing method capable of obtaining a cured product. In the case of using, for example, a thermosetting resin, as the curable resin, the top coat layer can be formed by heating the uncured resin layer under appropriate temperature conditions to prepare a cured product.

In the case of using an ionizing radiation curable resin as the curable resin, the top coat layer can be formed by irradiating the uncured resin layer with ionizing radiation such as electron beam or ultraviolet ray to prepare a cured product. In this case, the acceleration voltage of the electron beam used as ionizing radiation can be appropriately selected according to the resin used or the thickness of the layer. Usually, the uncured resin layer is preferably cured at an acceleration voltage on the order of 70 to 300 kV. The irradiation dose is preferably an amount that saturates the cross-link density of the ionizing radiation curable resin, and is selected within the range of usually 5 to 300 kGy (0.5 to 30 Mrad), preferably 10 to 50 kGy (1 to 5 Mrad).

In the case of establishing a primer layer as one of the layers constituting the surface protection layer, a resin composition constituting the primer layer can be applied onto the transparent resin layer by a known method such as a gravure printing method, a bar coating method, a roll coating method, a reverse roll coating method, or a comma coating method, and dried and cured, if necessary, followed by the formation of the top coat layer by the method described above.

A concavo-convex pattern may be imparted to the decorative sheet of the present invention by embossing or the like.

In the case of performing embossing, for example, the decorative sheet is heated to preferably 80° C. or higher and 260° C. or lower, more preferably 85° C. or higher and 160° C. or lower, further preferably 100° C. or higher and 140° C. or lower, and an embossing plate can be pressed against the decorative sheet for embossing. The location against which the embossing plate is pressed is preferably the surface protection layer side of the decorative sheet.

[Decorative Material]

The decorative material of the present invention comprises an adherend and the decorative sheet of the present invention described above. Specifically, the adherend and the decorative sheet are laminated such that a face of the adherend requiring decoration and a face of the decorative sheet on the base material layer side are opposed to each other.

FIG. 2 is a cross-sectional view showing an embodiment of a decorative material 200 of the present invention.

The decorative material 200 of FIG. 2 has a decorative sheet 100 of the present invention, an adhesive layer B 210, and an adherend 220 in the presented order. A base material layer 150 of the decorative sheet 100 and the adherend 220 are laminated in an opposed manner via the adhesive layer B 210.

<Adherend>

Examples of the adherend include flat plates made of various materials, boards such as curved plates, three-dimensionally shaped goods, and sheets (or films). Examples thereof include: boards made of various wood such as Japanese cedar, Japanese cypress, pine, and lauan, for example, wood veneer, plywood, laminated wood, particle boards, and wood fiberboards (e.g., MDF (medium-density fiberboard)), and wood members for use as three-dimensionally shaped goods; metal members, such as iron, copper, aluminum, and titanium, for use as boards, steel plates, three-dimensionally shaped goods, or sheets; ceramic members, such as glass, ceramics such as pottery, non-cement ceramic materials such as gypsum, and non-pottery ceramic materials such as ALC (autoclaved lightweight aerated concrete) plates, for use as boards or three-dimensionally shaped goods; and resin members, such as acrylic resin, polyester resin, polystyrene resin, polyolefin resin (e.g., polypropylene), ABS (acrylonitrile-butadiene-styrene copolymer) resin, phenol resin, vinyl chloride resin, cellulose resin, and rubbers, for use as boards, three-dimensionally shaped goods, or sheets. These members can be used singly or in combination of two or more thereof.

The adherend can be appropriately selected from among those described above according to a purpose. At least one member selected from the group consisting of a wood member, a metal member and a resin member is preferred for purposes of building interior members such as walls, ceilings, and floors or exterior members such as exterior walls, roofs, eave ceilings, fences, and gates, and joinery or fixture members such as window frames, doors, railings, baseboards, crown moldings, and covers. At least one member selected from the group consisting of a metal member and a resin member is preferred for purposes of exterior members such as front doors and joinery such as window frames and doors.

The thickness of the adherend can be appropriately selected according to a purpose and a material and is preferably 0.1 mm or larger and 10 mm or smaller, more preferably 0.3 mm or larger and 5 mm or smaller, further preferably 0.5 mm or larger and 3 mm or smaller.

<Adhesive Layer B>

The adherend and the decorative sheet are preferably laminated via adhesive layer B, i.e., the decorative material of the present invention preferably has the adherend, adhesive layer B and the decorative sheet in the presented order, in order to obtain excellent adhesiveness.

The adhesive for use in the adhesive layer B is not particularly limited, and a known adhesive can be used. Examples thereof preferably include adhesives such as moisture curing adhesives, anaerobic curing adhesives, dry curing adhesives, UV curing adhesives, heat-sensitive adhesives (e.g., hot-melt adhesives), and pressure-sensitive adhesives. A moisture curing adhesive and a heat-sensitive adhesive are preferred in consideration of compatibility with the decorative material of the present embodiment having a predetermined water vapor transmission rate, easy handling, etc. Particularly, the heat-sensitive adhesive is preferred because adhesive power rises up to saturation at the same time with the cooling and solidification of a melted adhesive layer in a liquid state. The moisture curing adhesive, when used in combination with the decorative material of the present embodiment, easily produces the initial adhesion strength of the adhesive used in the adhesive layer because the moisture curing adhesive can come into contact with moderate humidity in a construction process. On the other hand, the moisture curing adhesive suppresses reduction in close contact caused by hydrolytic degradation because the moisture curing adhesive does not come into contact with excessive humidity. As a result, much better construction suitability as well as long-term close contact are easily obtained. The moisture curing adhesive is also preferred from the viewpoint of easy handling, etc.

Examples of the resin for use in the adhesive constituting this adhesive layer include acrylic resin, polyurethane resin, vinyl chloride resin, vinyl acetate resin, vinyl chloride-vinyl acetate copolymer resin, styrene-acrylic copolymer resin, polyester resin, and polyamide resin. These resins can be used singly or in combination of two or more thereof. A two-part curing polyurethane adhesive involving a curing agent such as an isocyanate compound, or a polyester adhesive is also applicable.

Alternatively, an adhesive may be used in the adhesive layer. The adhesive can be appropriately selected, for use, from the group consisting of acrylic, urethane, silicone, and rubber, etc.

A moisture curing adhesive, one of the adhesives preferably used in the present invention, containing urethane resin in the resin system, contains a prepolymer having isocyanate groups at molecular ends, as an essential component. The prepolymer is usually a polyisocyanate prepolymer having one or more isocyanate groups at each of both molecular ends and is in the state of a solid thermoplastic resin at ordinary temperature. Examples of such a polyisocyanate prepolymer include prepolymers obtained using polyester polyol that is a crystalline solid at ordinary temperature as a polyol component and using polyisocyanate consisting of 4,4-diphenylmethane diisocyanate or tolylene diisocyanate as a polyisocyanate component.

The thickness of the adhesive layer B is not particularly limited and is preferably 1 μm or larger and 100 μm or smaller, more preferably 5 μm or larger and 50 μm or smaller, further preferably 10 μm or larger and 30 μm or smaller, from the viewpoint of obtaining excellent adhesiveness.

<Method for Producing Decorative Material>

The decorative material can be produced through the step of laminating the decorative sheet with an adherend.

This step is the step of laminating the decorative sheet of the present invention with an adherend such that a face of the adherend requiring decoration and a face of the decorative sheet on the base material layer side are opposed to each other. Examples of the method for laminating the decorative sheet with the adherend include a lamination method which involves laminating the decorative sheet to a plate-like adherend via adhesive layer B by applying pressure thereto using a pressure roller.

In the case of using a hot-melt adhesive (heat-sensitive adhesive) as the adhesive, the warming temperature is preferably 160° C. or higher and 200° C. or lower, though varying depending on the type of the resin constituting the adhesive, and is preferably 100° C. or higher and 130° C. or lower for a reactive hot-melt adhesive. Vacuum molding is generally performed under heating. Its temperature is preferably 80° C. or higher and 130° C. or lower, more preferably 90° C. or higher and 120° C. or lower.

The decorative material thus obtained can be arbitrarily cut, and the surface or a butt end portion can be arbitrarily decorated by grooving, chamfering, or the like using a cutting machine such as a router or a cutter. The decorative material can be used for various purposes, for example, various members such as building interior members such as walls, ceilings, floors, and front doors or exterior members such as exterior walls, roofs, eave ceilings, fences, and gates, joinery or fixture members such as window frames, doors, railings, baseboards, crown moldings, and covers as well as general furniture such as drawers, shelves, and desks, kitchen furniture such as dining tables and sinks, or cabinets for light electrical products or office automation equipment, and vehicle interior and exterior members.

EXAMPLES

Next, the present invention will be described in more detail with reference to Examples. However, the present invention is not limited by these examples by any means.

1. Evaluation and Measurement 1-1. Absorbance

Absorbance $A_{12}$ at wavelengths from 270 to 300 nm and absorbance $A_{22}$ at a wavelength of 310 nm of a laminate of a surface protection layer formed on a transparent resin layer were measured in accordance with JIS K0115: 2004 using an ultraviolet-visible-near infrared spectrophotometer (manufactured by Hitachi, Ltd., trade name: U-4000). Absorbance $A_{10}$ at wavelengths from 270 to 300 nm and absorbance $A_{20}$ at a wavelength of 310 nm of the transparent resin layer were also measured by the same approach as above. The absorbance $A_{10}$ was subtracted from the absorbance $A_{12}$ to calculate absorbance $A_{11}$ of the surface protection layer at wavelengths from 270 to 300 nm. The absorbance $A_{20}$ was subtracted from the absorbance $A_{22}$ to calculate absorbance $A_{21}$ of the surface protection layer at a wavelength of 310 nm.

1-2. Weather Resistance

A decorative sheet obtained in each of Examples and Comparative Examples was irradiated with ultraviolet ray for 20 hours under conditions involving a black panel temperature of 63° C. and an illuminance of 100 mW/cm² using a super-accelerated weather resistance testing apparatus given below, and then condensed for 4 hours. This cycle was repeated. After a lapse of 800 hours, the appearance of the decorative sheet was visually evaluated according to criteria given below.

<Super-Accelerated Weather Resistance Testing Apparatus>

A super-accelerated weather resistance testing apparatus (trade name: EYE Super UV Tester SUV-W161, manufactured by Iwasaki Electric Co., Ltd.) equipped with a UV lamp (trade name: M04-L21WB/SUV, manufactured by Iwasaki Electric Co., Ltd.), a lamp jacket (trade name: WJ50-SUV, manufactured by Iwasaki Electric Co., Ltd.) and an illuminance meter (trade name: UVD-365PD, manufactured by Iwasaki Electric Co., Ltd.).

<Evaluation Criteria>

A: No appearance change was confirmed in the whole decorative sheet.

B: Although slight whitening was confirmed in the appearance of the decorative sheet, no color change was able to be confirmed in at least one of the transparent resin layer and the base material layer.

C: Slight whitening was confirmed in the appearance of the decorative sheet, and slight color change was also confirmed in at least one of the transparent resin layer and the base material layer.

D: Marked whitening in the appearance of the decorative sheet and significant color change in at least one of the transparent resin layer and the base material layer were confirmed.

1-3. Measurement of Water Vapor Transmission Rate

The water vapor transmission rate of a decorative sheet obtained in each of Examples and Comparative Examples was measured in accordance with Testing Methods for Determination of the Water Vapor Transmission Rate of Moisture-Proof Packaging Materials (Dish Method) stipulated by JIS Z0208: 1976.

1-4. Evaluation of Construction Suitability

A decorative sheet obtained in each of Examples and Comparative Examples was affixed to a flat plate-like adherend having a width of 25 mm (material: polyvinyl chloride (PVC)) via an adhesive layer having a thickness of 50 μm prepared by melting a moisture curing and hot-melt urethane resin adhesive (polyurethane prepolymer having isocyanate groups in the molecule, "1308.20 (trade name)", manufactured by TAKA) at 120° C. The adhesive layer was cooled and solidified at room temperature (23° C.) and left for 1 hour in an environment of 90° C. to prepare a sample. A peeling test was conducted in a temperature environment of 25° C. under conditions involving a tensile rate of 10 mm/min, a peeling direction of 90°, and a chuck distance of 30 mm using Tensilon Universal Material Testing Instrument ("Tensilon RTC-1250A (trade name)", manufactured by Orientec Co., Ltd.). Peeling strength was measured as initial adhesion strength and evaluated according to criteria given below. A sample given a score of B or higher passed the evaluation of construction suitability.

A: The peeling strength was 1.0 N/mm or more.

B: The peeling strength was 0.5 N/mm or more and less than 1.0 N/mm.

C: The peeling strength was less than 0.5 N/mm.

1-5. Evaluation of Long-Term Close Contact

The sample prepared in the preceding section "1-4. Evaluation of construction suitability" was left for 6 weeks in a hot and humid environment of 70° C. and 90% RH. Then, a peeling test was conducted in a temperature environment of 25° C. under conditions involving a tensile rate of 50 mm/min and a peeling direction of 90° using Tensilon Universal Material Testing Instrument ("Tensilon RTC-1250A (trade name)", manufactured by Orientec Co., Ltd.). Peeling strength was measured and evaluated according to criteria given below. A sample given a score of B or higher passed the evaluation of long-term close contact.

A: The peeling strength was 2.0 N/mm or more.
B: The peeling strength was 1.0 N/mm or more and less than 2.0 N/mm.
C: The peeling strength was less than 1.0 N/mm.

Example 1

A decoration layer was formed using two-part curing printing ink consisting of urethane resin on one face of a base material layer (polyester film having a thickness of 60 μm ("W410", manufactured by Mitsubishi Chemical Corp.)) treated by corona discharge on both sides. Subsequently, adhesive layer A consisting of a urethane resin adhesive and having a thickness of 3 μm was formed on the decoration layer.

Subsequently, a resin composition containing 0.12 parts by mass of hydroxyphenyltriazine ultraviolet absorber 1 (trade name: TINUVIN 460, manufactured by BASF SE) and 0.15 parts by mass of hydroxyphenyltriazine ultraviolet absorber 2 (trade name: ADK STAB LA-46, manufactured by ADEKA Corp.) per 100 parts by mass of polypropylene resin was heated, melted, and extruded onto the adhesive layer A using a T-die extruder to form a transparent resin layer having a thickness of 80 μm.

After the surface treatment of the transparent resin layer by corona discharge, a resin composition containing a mixture of a composition consisting of a polycarbonate urethane-acrylic copolymer and acrylic polyol, and hexamethylene diisocyanate at a mass ratio of 100:5 was applied onto the transparent resin layer and dried to form a primer layer having a thickness of 4 μm.

Subsequently, a resin composition containing 2 parts by mass of hydroxyphenyltriazine ultraviolet absorber 1 (trade name: TINUVIN 460, manufactured by BASF SE) and 3 parts by mass of a hindered amine light stabilizer (trade name: TINUVIN 123, manufactured by BASF SE) per 100 parts by mass of an ionizing radiation curable resin composition consisting of a trifunctional urethane acrylate oligomer having a weight-average molecular weight of 4000 was applied onto the primer layer, and the ionizing radiation curable resin composition was cured by irradiation with electron beam so that a top coat layer having a thickness of 5 μm was formed to form a surface protection layer consisting of the primer layer and the top coat layer.

Subsequently, a wood-grain conduit-like concavo-convex pattern having a depth of 50 μm was formed by embossing from above the top coat layer to obtain a decorative sheet of Example 1. The obtained decorative sheet was evaluated for its weather resistance by the method described above. The obtained decorative sheet was evaluated for its construction suitability and long-term close contact. Absorbances and evaluation results are shown in Table 1.

Examples 2 and 3

Decorative sheets of Examples 2 to 4 were prepared in the same manner as in Example 1 except that the amounts of the ultraviolet absorbers contained in the resin compositions to form the transparent resin layer and the top coat layer were changed as shown in Table 1. The obtained decorative sheets were evaluated for their weather resistance by the method described above. Absorbances and evaluation results are shown in Table 1.

Comparative Examples 1 to 3

Decorative sheets of Comparative Examples 1 to 3 were prepared in the same manner as in Example 1 except that the amounts of the ultraviolet absorbers contained in the resin compositions to form the transparent resin layer and the top coat layer were changed as shown in Table 1. The obtained decorative sheets were evaluated for their weather resistance by the method described above. Absorbances and evaluation results are shown in Table 1.

TABLE 1

|  | Example | | | Comparative Example | | |
| --- | --- | --- | --- | --- | --- | --- |
|  | 1 | 2 | 3 | 1 | 2 | 3 |
| Transparent resin layer | | | | | | |
| Ultraviolet absorber 1 (parts by mass) | 0.12 | 0.12 | 0.12 | 0.12 | 0.12 | 0.12 |
| Ultraviolet absorber 2 (parts by mass) | 0.12 | — | — | — | — | 0.15 |
| Top coat layer | | | | | | |
| Ultraviolet absorber 1 (parts by mass) | 2.0 | 1.0 | 1.5 | 2.0 | 1.5 | 1.5 |
| Ultraviolet absorber 2 (parts by mass) | — | 1.0 | 1.0 | — | — | — |
| Absorbance | | | | | | |
| Absorbance $A_{11}$ (360-380 nm) | 0.6 | 1.2 | 1.4 | 0.6 | 0.4 | 0.4 |
| Absorbance $A_{12}$ (360-380 nm) | 3.6 | 3.2 | 3.4 | 2.6 | 2.4 | 3.4 |
| Absorbance $A_{10}$ (360-380 nm) | 3.0 | 2.0 | 2.0 | 2.0 | 2.0 | 3.0 |
| Absorbance $A_{21}$ (310 nm) | 0.8 | 0.8 | 1.0 | 0.8 | 0.6 | 0.6 |
| Absorbance $A_{22}$ (310 nm) | 1.6 | 1.2 | 1.4 | 1.2 | 1.0 | 1.4 |
| Absorbance $A_{20}$ (310 nm) | 0.8 | 0.4 | 0.4 | 0.4 | 0.4 | 0.8 |
| Absorbance $A_{11}$/Absorbance $A_{12}$ | 0.17 | 0.38 | 0.41 | 0.23 | 0.17 | 0.12 |
| Base material layer thickness (μm) | 60 | 60 | 60 | 60 | 60 | 60 |
| Transparent resin layer thickness (μm) | 80 | 80 | 80 | 80 | 80 | 80 |
| Water vapor transmission rate (g/m² · 24 h) | 8 | — | — | — | — | — |
| Evaluation of weather resistance | | | | | | |
| 800 hr | A | A | B | B | C | C |
| 1000 hr | B | B | B | C | D | D |

TABLE 1-continued

|  | Example | | | Comparative Example | | |
|---|---|---|---|---|---|---|
|  | 1 | 2 | 3 | 1 | 2 | 3 |
| Construction suitability | A | — | — | — | — | — |
| Long-term close contact | A | — | — | — | — | — |

Examples 4 and 5

Decorative sheets of Examples 4 and 5 were prepared in the same manner as in Example 1 except that the thickness of the base material layer in Example 1 was changed to the thickness shown in Table 2. The obtained decorative sheets were evaluated for their weather resistance, construction suitability and long-term close contact by the methods described above. Absorbances and evaluation results are shown in Table 2.

Reference Examples 1 and 2

Decorative sheets of Reference Examples 1 and 2 were prepared in the same manner as in Example 1 except that the thickness of the base material layer in Example 1 was changed to the thickness shown in Table 2. The obtained decorative sheets were evaluated for their weather resistance, construction suitability and long-term close contact by the methods described above. Absorbances and evaluation results are shown in Table 2.

The water vapor transmission rate of the decorative sheet of Example 1 fell within the range of 0.75 g/m²·24 h or more and 45 g/m²·24 h or less, confirming that this decorative sheet is excellent not only in weather resistance but in construction suitability and long-term close contact. The decorative sheets of Examples 2 and 3 also had the same thicknesses of the base material layer and the transparent resin layer as those in Example 1. Therefore, their water vapor transmission rates were considered equivalent to that of Example 1, and their construction suitability and long-term close contact are also considered excellent.

The water vapor transmission rates of the decorative sheets of Examples 4 and 5 fell within the range of 0.75 g/m²·24 h or more and 45 g/m²·24 h or less, confirming that these decorative sheets are excellent not only in weather resistance but in construction suitability and long-term close contact. The decorative sheets of Reference Examples 1 and 2 are examples showing the relationship between the water vapor transmission rate and the evaluation of construction suitability and long-term close contact. These decorative

TABLE 2

|  | Example | | Reference Example | |
|---|---|---|---|---|
|  | 4 | 5 | 1 | 2 |
| Transparent resin layer | | | | |
| Ultraviolet absorber 1 (parts by mass) | 0.12 | 0.12 | 0.12 | 0.12 |
| Ultraviolet absorber 2 (parts by mass) | 0.12 | 0.12 | 0.12 | 0.12 |
| Top coat layer | | | | |
| Ultraviolet absorber 1 (parts by mass) | 2.0 | 2.0 | 2.0 | 2.0 |
| Ultraviolet absorber 2 (parts by mass) | — | — | — | — |
| Absorbance | | | | |
| Absorbance $A_{11}$ (360-380 nm) | 0.6 | 0.6 | 0.6 | 0.6 |
| Absorbance $A_{12}$ (360-380 nm) | 3.6 | 3.6 | 3.6 | 3.6 |
| Absorbance $A_{10}$ (360-380 nm) | 3.0 | 3.0 | 3.0 | 3.0 |
| Absorbance $A_{21}$ (310 nm) | 0.8 | 0.8 | 0.8 | 0.8 |
| Absorbance $A_{22}$ (310 nm) | 1.6 | 1.6 | 1.6 | 1.6 |
| Absorbance $A_{20}$ (310 nm) | 0.8 | 0.8 | 0.8 | 0.8 |
| Absorbance $A_{11}$/Absorbance $A_{12}$ | 0.17 | 0.17 | 0.17 | 0.17 |
| Base material layer thickness (μm) | 100 | 40 | 20 | 150 |
| Transparent resin layer thickness (μm) | 80 | 80 | 80 | 80 |
| Water vapor transmission rate (g/m² · 24 h) | 2 | 13 | 52 | 0.5 |
| Evaluation of weather resistance | | | | |
| 800 hr | A | A | A | A |
| 1000 hr | B | B | B | B |
| Construction suitability | A | A | A | C |
| Long-term close contact | A | A | C | A |

From the results of Tables 1 and 2, it was confirmed that a decorative sheet having absorbance $A_{11}$ of 0.6 or more and absorbance $A_{12}$ of 2.7 or more is excellent in weather resistance. On the other hand, it was confirmed that excellent weather resistance cannot be obtained if at least one of absorbance $A_{11}$ and absorbance $A_{12}$ does not satisfy the condition.

sheets had absorbance $A_{11}$ of 0.6 or more and absorbance $A_{12}$ of 2.7 or more and therefore obtained excellent weather resistance. However, their water vapor transmission rates fell outside the range of 0.75 g/m²·24 h or more and 45 g/m²·24 h or less, confirming that these decorative sheets have neither excellent construction suitability nor long-term close contact.

INDUSTRIAL APPLICABILITY

The decorative sheet of the present invention has excellent weather resistance and as such, is suitably used as a decorative sheet for various members such as building interior members such as walls, ceilings, floors, and front doors, or exterior members, joinery or fixture members such as window frames, doors, railings, baseboards, crown moldings, and covers as well as general furniture such as drawers, shelves, and desks, kitchen furniture such as dining tables and sinks, or cabinets for light electrical products or office automation equipment, particularly, members for use in environments exposed directly to sunlight, and members for vehicle interior or exterior use. The decorative material of the present invention is suitably used as any of the various members described above, particularly, members for use in environments exposed directly to sunlight.

REFERENCE SIGNS LIST

- 100: Decorative sheet
- 111: Top coat layer
- 112: Primer layer
- 110: Surface protection layer
- 120: Transparent resin layer
- 130: Adhesive layer A
- 141: Picture layer
- 142: Solid colored layer
- 140: Decoration layer
- 150: Base material layer
- 200: Decorative material
- 210: Adhesive layer B
- 220: Adherend

The invention claimed is:

1. A decorative sheet comprising a base material layer, a transparent resin layer and a surface protection layer in the presented order, wherein at least one of the base material layer and the transparent resin layer is constituted by a resin composition comprising a resin having an ultraviolet absorption wavelength at least at 270 to 300 nm; and absorbance $A_{11}$ of the surface protection layer at wavelengths from 270 to 300 nm is 0.6 or more, and absorbance $A_{12}$ of the transparent resin layer and the surface protection layer at wavelengths from 270 to 300 nm is 2.7 or more, the absorbances being measured in accordance with JIS K0115: 2004.

2. The decorative sheet according to claim 1, wherein absorbance $A_{21}$ of the surface protection layer at a wavelength of 310 nm is 0.8 or more, and absorbance $A_{22}$ of the transparent resin layer and the surface protection layer at a wavelength of 310 nm is 1.1 or more.

3. The decorative sheet according to claim 1, wherein the resin having an ultraviolet absorption wavelength at least at 270 to 300 nm is at least one resin selected from the group consisting of polyester resin and polycarbonate resin.

4. The decorative sheet according to claim 1 wherein at least one of the transparent resin layer and the surface protection layer comprises a triazine ultraviolet absorber.

5. The decorative sheet according to claim 4, wherein the triazine ultraviolet absorber is a hydroxyphenyltriazine ultraviolet absorber.

6. The decorative sheet according to claim 1, wherein at least one of the transparent resin layer and the surface protection layer comprises a light stabilizer.

7. The decorative sheet according to claim 1, wherein the surface protection layer has a top coat layer comprising a cured product of a curable resin composition.

8. The decorative sheet according to claim 7, wherein the curable resin composition is an ionizing radiation curable resin composition.

9. The decorative sheet according to claim 7, wherein the surface protection layer further has a primer layer, and the primer layer is a layer formed between the top coat layer and the transparent resin layer.

10. The decorative sheet according to claim 1, further comprising a decoration layer between the base material layer and the transparent resin layer.

11. The decorative sheet according to claim 1, wherein a ratio of the absorbance $A_{11}$ to the absorbance $A_{12}$ (absorbance $A_{11}$ dabsorbance $A_{12}$) is 0.10 or more and 0.50 or less.

12. The decorative sheet according to claim 1, wherein a water vapor transmission rate measured in accordance with Testing Methods for Determination of the Water Vapor Transmission Rate of Moisture-Proof Packaging Materials (Dish Method) stipulated by JIS Z0208: 1976 is 0.75 g/m²·24 h or more and 45 g/m²·24 h or less.

13. A decorative material comprising an adherend and a decorative sheet according to claim 1.

* * * * *